US012682186B1

(12) United States Patent
Wen et al.

(10) Patent No.: US 12,682,186 B1
(45) Date of Patent: Jul. 14, 2026

(54) SYSTEMS AND METHODS FOR GENERATING A SELF-LEARNING AND SELF-IMPROVING DIALOGUE SYSTEM

(71) Applicant: PolyAI Limited, London (GB)

(72) Inventors: Tsung-Hsien Wen, London (GB); Matt Henderson, London (GB); Eshan Singhal, London (GB); Paula Czarnowska, London (GB); Meghan Berton, London (GB); Joshua Neizer, London (GB); Colman Yau, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 19/322,207

(22) Filed: Sep. 8, 2025

(51) Int. Cl.
*G06F 40/40* (2020.01)
*G06N 3/096* (2023.01)
(52) U.S. Cl.
CPC ............. *G06F 40/40* (2020.01); *G06N 3/096* (2023.01)
(58) Field of Classification Search
CPC ................................. G06F 40/40; G06N 3/096
See application file for complete search history.

(56) References Cited

U.S. PATENT DOCUMENTS

| | | | |
|---|---|---|---|
| 7,027,987 B1 * | 4/2006 | Franz | G10L 15/22 |
| | | | 707/999.005 |
| 7,379,870 B1 * | 5/2008 | Belvin | G10L 15/18 |
| | | | 704/255 |
| 11,132,988 B1 | 9/2021 | Steedman Henderson et al. | |
| 11,210,306 B2 | 12/2021 | Steedman Henderson et al. | |
| 11,430,446 B1 | 8/2022 | Wen et al. | |
| 11,537,661 B2 | 12/2022 | Coope et al. | |

(Continued)

OTHER PUBLICATIONS

Henderson et al, ConveRT: Efficient and Accurate Conversational Representations from Transformers, arXiv:1911.03688v2, Apr. 29, 2020, pp. 1-11.

(Continued)

*Primary Examiner* — Athar N Pasha
(74) *Attorney, Agent, or Firm* — Pillsbury Winthrop Shaw Pittman LLP

(57) ABSTRACT

A computer-implemented method of generating a self-learning and a self-improving dialogue system, the method comprising:

receiving a first language model trained to emulate a persona of a first user of the dialogue system;

receiving a second language model trained to evaluate a first dialogue system output;

generating, using the first language model, a first language model output emulating the persona of the first user of the dialogue system;

providing the first language model output to a third language model, wherein the third language model is trained to generate one or more dialogue system outputs from the dialogue system;

responsive to the first language model output, generating, using the third language model, the first dialogue system output, thereby generating a simulated dialogue between the first language model and the third language model, the simulated dialogue comprising at least the first language model output and the first dialogue system output;

evaluating, using the second language model, the first dialogue system output; and fine-tuning, using the generated simulated dialogue and the evaluation of the first dialogue system output, the third language model.

16 Claims, 12 Drawing Sheets

(56) References Cited

U.S. PATENT DOCUMENTS

| | | | | |
|---|---|---|---|---|
| 2024/0404514 | A1* | 12/2024 | Rollwage | G16H 50/20 |
| 2024/0419922 | A1* | 12/2024 | Molitor | G06F 3/0482 |
| 2025/0061529 | A1* | 2/2025 | Saldivar, III | G06Q 50/205 |
| 2025/0124340 | A1* | 4/2025 | Ni | G06N 20/00 |
| 2025/0328773 | A1* | 10/2025 | Son | G06N 3/092 |
| 2025/0335817 | A1* | 10/2025 | Tiwari | G06N 20/00 |
| 2025/0337707 | A1* | 10/2025 | Wen | H04L 51/216 |

OTHER PUBLICATIONS

Budzianowski, et al., Pheme: Efficient and Conversational Speech Generation, Jan. 5, 2024, pp. 1-15. https://arxiv.org/pdf/2401.02839.

Li et al, StyleTTS 2: Towards Human-Level Text-to-Speech through Style Diffusion and Adversarial Training with Large Speech Language Models, Nov. 20, 2023, pp. 1-28. https://arxiv.org/pdf/2306.07691.

Braun et al, Evaluating natural language understanding services for conversational question answering systems, In Proceedings of SIGDIAL, Aug. 15-17, 2017, pp. 174-185.

"AlphaGo," Wikipedia, The Free Encyclopedia, available at <https://en.wikipedia.org/wiki/AlphaGo>, retrieved Dec. 12, 2025, pp. 1-22.

"What is Nvidia Cosmos?," Wikipedia, The Free Encyclopedia, available at <https://www.nvidia.com/en-GB/ai/cosmos/>, retrieved Dec. 12, 2025, pp. 1-15.

"How self-learning agents are improving customer service experience—How self-learning AI agents are reshaping CX," Wikipedia, The Free Encyclopedia, available at <https://poly.ai/blog/self-learning-ai-agents-customer-service/>, retrieved Dec. 12, 2025, pp. 1-9.

* cited by examiner

541

Providing a first language model prompt to generate a dialogue based on a task, a scenario, or both    542

Generating, using the first language model prompt, a first language model output    543

544

Receiving further dialogues between a first user and the dialogue system    545

Updating, using supervised fine-tuning, the first large language model    546

771

Providing a second language model prompt to evaluate outputs from the third large language model

772

Evaluating an output in response to a user input from the third large language model

773

Annotating the evaluated output

774

776

Receiving further feedback from human manager and/or first user
777

Updating, using supervised fine-tuning, the second large language model
778

881

Receiving a first large language model output
882

Generating a simulated dialogue
883

Receiving, from the second large language model, evaluation of the simulated dialogue
884

Updating, based on the simulated dialogue and the evaluation, the third large language model
885

SYSTEMS AND METHODS FOR GENERATING A SELF-LEARNING AND SELF-IMPROVING DIALOGUE SYSTEM

TECHNICAL FIELD

The present disclosure relates to the field of dialogue systems and dialogue methods. More specifically, the present disclosure relates to self-learning and self-improving dialogue systems and dialogue methods.

BACKGROUND

Dialogue systems such as for example, chatbots or voice-based agents, may be designed to interact with humans (e.g., users of the dialogue systems) via voice or text-based conversations. Dialogue systems may be used in a wide variety of applications ranging from personal assistants, medical assistants, and/or the like, to providing customer service, customer support, and/or the like.

In recent times, a growing number of dialogue systems are based on large language models (LLMs) that comprise generative pre-trained transformer architecture. LLMs can be trained on extensive datasets to perform a wide range of tasks. A trained LLM may be incorporated into dialogue systems. This LLM may be configured to respond to one or more inputs from the users of the dialogue systems. An output from a dialogue system may comprise a response from the LLM. Thus, the dialogue systems may engage in one or more dialogues with the users of the dialogue systems. To improve responses from the LLM (and consequently the responses from the dialogue systems), the dialogue system may be updated regularly (e.g., by updating the LLM).

However, updating dialogue systems to provide improved responses is a manual process. For instance, in existing dialogue systems that incorporate an LLM, a human manager analyses dialogues between the dialogue systems and the users. This analysis may be sent to a developer who adjusts the parameters and/or configuration of the LLM to update the LLM so as to provide improved responses. Therefore, the process of updating a dialogue system can be cumbersome. Furthermore, such processes can be inefficient and not scalable.

Accordingly, dialogue systems and dialogue methods that are capable of self-learning and self-improving are desirable. Systems and methods for generating self-learning and self-improving dialogue systems and dialogue methods are desirable.

SUMMARY

According to a first aspect, there is provided a computer-implemented method of generating a self-learning and a self-improving dialogue system. The computer-implemented method comprises:

receiving a first language model trained to emulate a persona of a first user of the dialogue system;

receiving a second language model trained to evaluate a first dialogue system output;

generating, using the first language model, a first language model output emulating the persona of the first user of the dialogue system;

providing the first language model output to a third language model, wherein the third language model is trained to generate one or more dialogue system outputs from the dialogue system;

responsive to the first language model output, generating, using the third language model, the first dialogue system output, thereby generating a simulated dialogue between the first language model and the third language model, the simulated dialogue comprising at least the first language model output and the first dialogue system output;

evaluating, using the second language model, the first dialogue system output; and fine-tuning, using the generated simulated dialogue and the evaluation of the first dialogue system output, the third language model.

In one example, the first language model is trained using supervised fine-tuning and based on one or more dialogues between the dialogue system and the first user of the dialogue system. Each dialogue of the one or more dialogues can comprise at least one dialogue system input from the first user and at least one dialogue system output from the dialogue system to the first user.

In one example, the first language model is updated at a predetermined time intervals. In some cases, generating the first language model output comprises providing the first language model with a first language model prompt, wherein the first language model prompt includes instructions to guide the first language model to generate one or more first language model outputs based on a task, a scenario, or both.

In one example, the second language model is trained using supervised fine-tuning and based on: a plurality of dialogue system outputs from the dialogue system, and feedback from a human manager to each of the plurality of dialogue system outputs.

In one example, evaluating the first dialogue system output may further comprise: responsive to the first language model output, generating, using the third language model, the first dialogue system output and a second dialogue system output; comparing, using the second language model, the first dialogue system output and the second dialogue system output; and identifying the first dialogue system output as a preferable dialogue system output of the first dialogue system output and the second dialogue system output.

In some cases, the method may further comprise: annotating, using the second language model, the first dialogue system output as a preferable dialogue system output, thereby generating an annotated first dialogue system output; and annotating, using the second language model, the second dialogue system output as a not preferable dialogue system output, thereby generating an annotated second dialogue system output. Fine-tuning the third language model may comprise providing the third language model with the annotated first dialogue system output and the annotated second dialogue system output.

In one example, the method may further comprise: receiving a second input from a second user of the dialogue system; and responsive to second input, generating, using the fine-tuned third language model, a third dialogue system output. In some cases, the method may further comprise responsive to second input, generating, using the fine-tuned third language model, the third dialogue system output and a fourth dialogue system output; evaluating, using the second language model, the third dialogue system output and the fourth dialogue system output; annotating the third dialogue system output as a preferable dialogue system output of the third dialogue system output and the fourth dialogue system output; and outputting the third dialogue system output to the second user.

In one example, fine-tuning the third language model comprises fine-tuning based on direct preference optimisation.

According to a second aspect, there is provided a non-transitory computer readable storage medium comprising computer readable code configured to cause a computer to perform a method comprising the following operations:

receiving a first language model trained to emulate a persona of a first user of the dialogue system;

receiving a second language model trained to evaluate a first dialogue system output;

generating, using the first language model, a first language model output emulating the persona of the first user of the dialogue system;

providing the first language model output to a third language model, wherein the third language model is trained to generate one or more dialogue system outputs from the dialogue system;

responsive to the first language model output, generating, using the third language model, the first dialogue system output, thereby generating a simulated dialogue between the first language model and the third language model, the simulated dialogue comprising at least the first language model output and the first dialogue system output;

evaluating, using the second language model, the first dialogue system output; and fine-tuning, using the generated simulated dialogue and the evaluation of the first dialogue system output, the third language model.

In one example, the method comprises further operations: training, using supervised fine-tuning and based on one or more dialogues between the dialogue system and the first user of the dialogue system, the first language model, each dialogue of the one or more dialogues comprising at least one dialogue system input from the first user and at least one dialogue system output from the dialogue system to the first user.

In one example, the method comprises further operations: training, using supervised fine-tuning, the second language model, wherein the training is based on: a plurality of dialogue system outputs from the dialogue system, and feedback from a human manager to each of the plurality of dialogue system outputs.

In one example, the method comprises further operations: responsive to the first language model output, generating, using the third language model, the first dialogue system output and a second dialogue system output; comparing, using the second language model, the first dialogue system output and the second dialogue system output; and identifying the first dialogue system output as a preferable dialogue system output of the first dialogue system output and the second dialogue system output.

In some cases, the method comprises further operations: annotating, using the second language model, the first dialogue system output as a preferable dialogue system output, thereby generating an annotated first dialogue system output; and annotating, using the second language model, the second dialogue system output as a not preferable dialogue system output, thereby generating an annotated second dialogue system output. The fine-tuning the third language model may comprise providing the third language model with the annotated first dialogue system output and the annotated second dialogue system output.

According to a third aspect, there is provided a dialogue system, comprising:

one or more processors, configured to:

receive a first language model trained to emulate a persona of a first user of the dialogue system;

receive a second language model trained to evaluate a first dialogue system output;

generate, using the first language model, a first language model output emulating the persona of the first user of the dialogue system;

provide the first language model output to a third language model, wherein the third language model is trained to generate one or more dialogue system outputs from the dialogue system;

responsive to the first language model output, generate, using the third language model, the first dialogue system output, thereby generating a simulated dialogue between the first language model and the third language model, the simulated dialogue comprising at least the first language model output and the first dialogue system output;

evaluate, using the second language model, the first dialogue system output; and fine-tune, using the generated simulated dialogue and the evaluation of the first dialogue system output, the third language model.

BRIEF DESCRIPTION OF THE DRAWINGS

Arrangements of the present technology will be understood and appreciated more fully from the following detailed description, made by way of example only and taken in conjunction with drawings in which.

DETAILED DESCRIPTION

Figure 1:
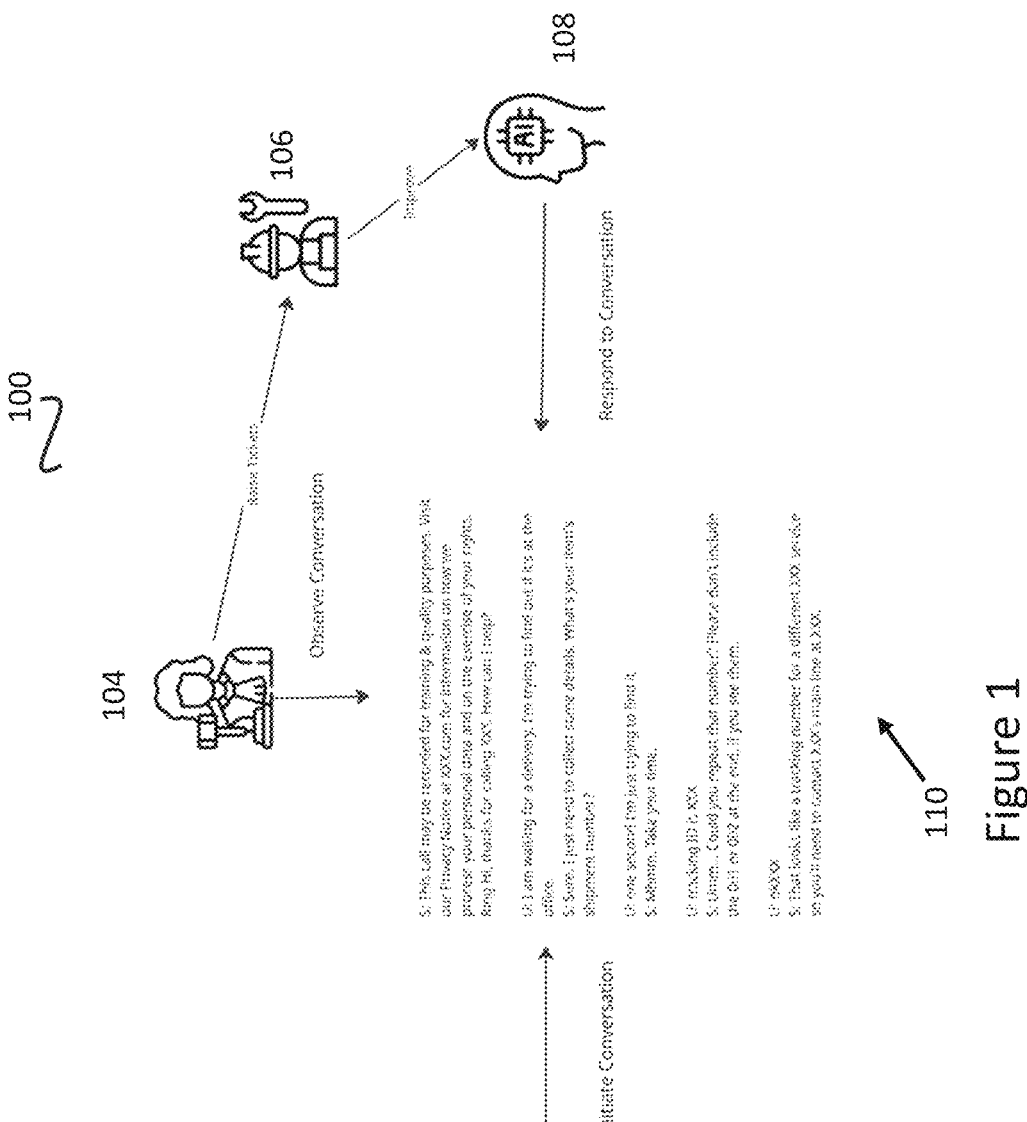
FIG. 1 is a schematic illustration of an existing process of updating a conventional dialogue system, according to an example.

Disclosed herein are self-improving and self-learning dialogue systems and dialogue methods. In particular, disclosed herein are systems and methods for generating self-improving and self-learning dialogue systems and dialogue methods. The dialogue systems described herein comprise one or more large language model(s).

"Self-improving" as used herein may refer to the ability of a dialogue system or a dialogue method to improve itself so as to provide improved dialogue system outputs. For instance, a "self-improving" dialogue system or dialogue method may be configured to update one or more parameters of a large language model of the dialogue system and/or may be configured to update a configuration of a large language model of the dialogue system independently and without external influence so as to provide improved dialogue system outputs. As an example, a "self-improving" dialogue system or dialogue method may be configured to update one or more parameters and/or may be configured to update a configuration of a large language model of the dialogue system without substantial human intervention. A "self-improving" dialogue system or dialogue method may provide improved dialogue system outputs without explicit human annotation or programming.

"Self-learning" as used herein may refer to the ability of a dialogue system or a dialogue method to learn by itself from dialogues with users of the dialogue system and/or from outputs of large language model(s) of the dialogue system and adapt by itself dialogue system outputs based on the learning. For instance, a large language model of the dialogue system may be configured to learn from dialogues with users of the dialogue system and/or from dialogues between the large language model and another large language model of the dialogue system without external influence. The large language model may adapt dialogue system outputs based on the learning and without external influence. As an example, a "self-learning" dialogue system or dialogue method may learn by itself and adapt by itself dialogue system outputs based on the learning without substantial human intervention. A "self-learning" dialogue system or dialogue method may learn and adapt without explicit human annotation or programming.

A "large language model" as described herein may refer to an artificial intelligence (AI) agent that autonomously performs one or more tasks. The AI agent may incorporate a generative pre-transformer model, and may be configured to: comprehend inputs from a user of the dialogue system, identify a problem to be solved, perform one or more complex tasks to solve the identified problem, evaluate one or more scenarios, adapt to the one or more scenarios, make decisions in order to achieve a goal, learn from dialogues, interact with other AI agents of the dialogue system, and/or to respond to inputs from the user of the dialogue system. Accordingly, a "large language model" described herein may not simply be a generative AI model that creates content. In contrast, a "large language model" described herein may be trained and configured to autonomously perform one or more complex tasks and make decisions to achieve a complex goal.

As discussed above, in conventional technology, updating a dialogue system is a manual process that relies heavily on human intervention and supervision. FIG. 1 is a schematic illustration of an existing process 100 of updating a conventional dialogue system 108. The conventional dialogue system 108 may comprise a large language model that is trained to comprehend inputs from a user and/or respond to inputs from the user. In the example in FIG. 1, a user 102 may initiate a dialogue 110 with the dialogue system 108. A human manager 104 may review the dialogue 110 between the user 102 and the dialogue system 108. As seen from FIG. 1, the dialogue 110 comprises inputs from user 102 and responses (i.e., dialogue system outputs) from the dialogue system 108. The human manager 104 may identify issues in the dialogue 110 between the user 102 and the dialogue system 108. For example, the human manager may identify that dialogue system outputs such as for example, "[m]hmm, Take your time," or "[u]mm . . . Could you repeat that number?", can be improved. The human manager 104 may flag these issues and raise one or more tickets. These tickets are provided to a human developer 106. The developer 106 may adjust one or more parameters and/or a configuration of the large language model of the dialogue system 108 based on the issues and the tickets. In this manner, the dialogue system 108 may be updated manually.

As seen in FIG. 1, process 100 relies heavily on human annotation and human supervision (e.g., human manager 104 and developer 106) to update the dialogue system 108, thereby making the process 100 inefficient, time-consuming, and unscalable. Furthermore, accumulating data to update the dialogue system 108 can be time-consuming and inefficient.

There are further challenges associated with existing process 100. For instance, simply using dialogues (e.g., dialogue 110) between the users (e.g., user 102) and the dialogue system 108 to update the dialogue system 108 may lead to a constraint in the volume and diversity of the data that is used to update the dialogue system 108. As an example, if a first user interacts with the dialogue system 108 significantly more than a second user, then the data that is used to update the dialogue system 108 may be skewed towards the first user. Thus, updating the dialogue system 108 with this data may bias the dialogue system 108 towards interacting with other users of the dialogue system 108 in a manner similar to the interaction with the first user. As another example, if a majority of interactions between the dialogue system 108 and the users (e.g., user 102) are genial and uncontentious in nature, then updating the dialogue system 108 with this data may not enable the dialogue system 108 to interact with an anomalous adversarial user. Another challenge associated with existing process 100 is that human annotation can be inconsistent. Updating the dialogue system 108 with inconsistent annotation may not facilitate the dialogue system 108 to provide improved dialogue system responses.

Described herein are systems and methods that overcome the challenges associated with process 100. In particular, the systems and methods described herein generate self-improving and self-learning dialogue systems and dialogue methods. The systems and methods described herein can provide improved dialogue system outputs without substantial human intervention or human supervision. Owing to minimal human annotation, the systems and methods described herein overcome the challenges associated with inconsistent human annotation of dialogues to update the dialogue system. Furthermore, the systems and methods described herein accumulate the data for updating the dialogue systems and dialogue methods in a fast and efficient manner. Additionally, the systems and methods described herein are efficient and scalable. The systems and methods described herein also address the challenge of volume and diversity of data that is used to update the dialogue systems.

Figure 2:
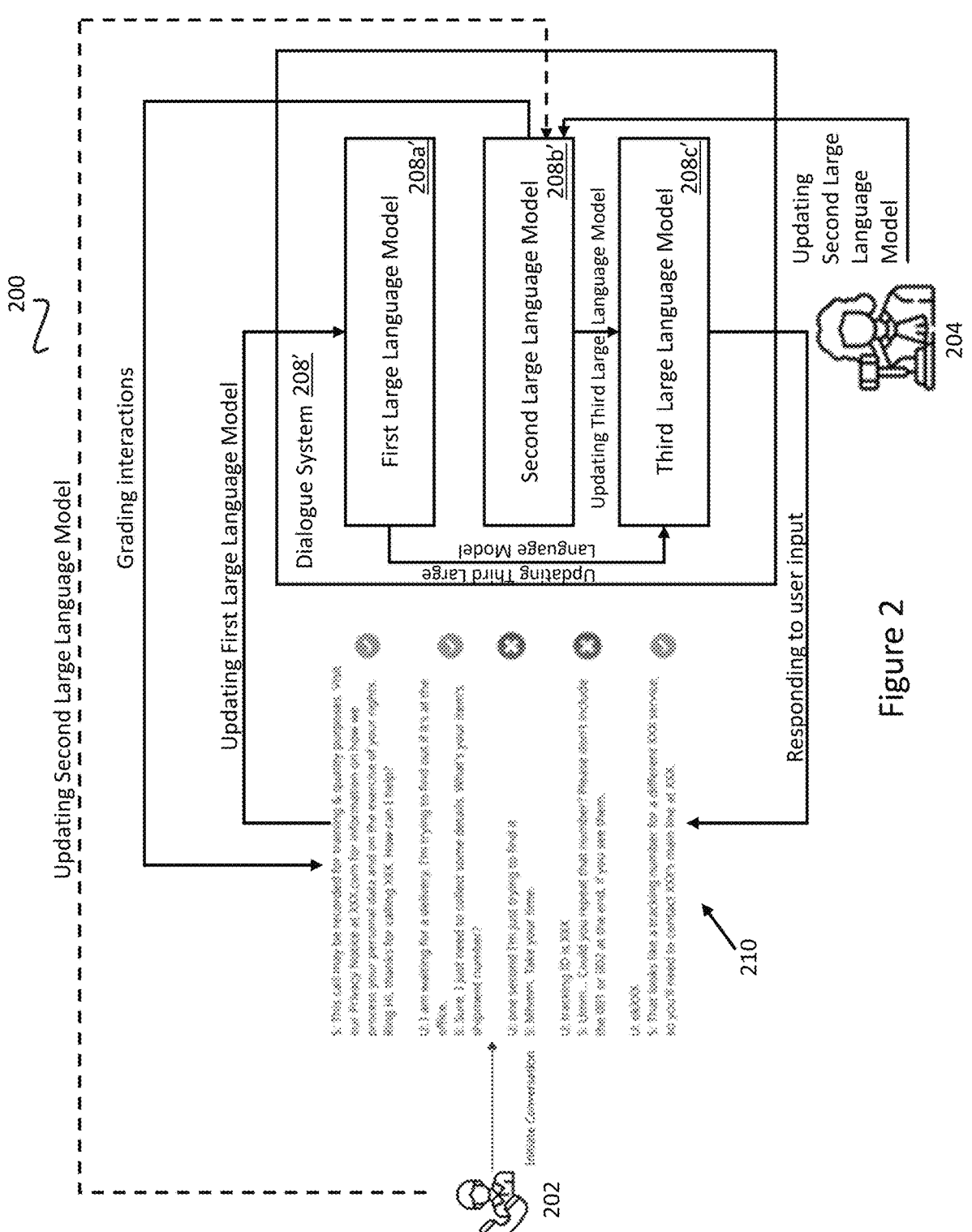
FIG. 2 is a schematic illustration of an overview of a process of updating a self-improving and self-learning dialogue system, according to an example.

FIG. 2 is a schematic illustration of an overview of a process 200 of updating a self-improving and self-learning dialogue system 208'. At a high-level, the dialogue system 208' can comprise at least three large language models, for example, a first large language model 208a', a second large language model 208b', and a third large language model 208c'.

The first large language model 208a' can be trained to emulate one or more personas of users of the dialogue system 208'. The second large language model 208b' can be trained to evaluate outputs from the third large language model 208c'. In some instances, an output from the dialogue system 208' (i.e., "dialogue system output") may comprise an output from the third language model 208c'. The third large language model 208c' can be trained to respond to inputs from a user of the dialogue system 208' (e.g., user 202 in FIG. 2). As noted above, a dialogue system output can comprise an output from the third large language model 208c'. Thus, the third large language model 208c' can be trained to generate one or more dialogue system outputs from the dialogue system 208'.

The first large language model 208a' can be configured to engage with and/or initiate a dialogue with the third large language model 208c'. As noted above, the first large language model 208a' can be trained to emulate a persona of a user of the dialogue system 208'. Accordingly, the output from the first large language model 208a' can emulate an input from a user of the dialogue system 208'. When the first large language model 208a' engages with and/or initiates a dialogue with the third large language model 208c', the output from the first large language model 208a' is provided as input to the third large language model 208c'. In response to receiving the output from the first large language model 208a', the third large language model 208c' responds to the emulated user input (i.e., output from the first large language model 208a'). In this manner, a dialogue can be generated between the first large language model 208a' and the third large language model 208c'. Dialogues between the first large language model 208a' and the third large language model 208c' may be referred to as "simulated dialogues." These dialogues simulate dialogues between users of the dialogue system 208' and the dialogue system 208'.

The second large language model 208b' may evaluate outputs from the third large language model 208c'. For instance, the second large language model 208b' can be configured to: identify whether an output from the third large language model 208c' is a good response, identify whether an output from the third large language model 208c' is a bad response, compare two outputs from the third large language model 208c' to a same input, and/or identify a preferable output between two outputs from the third large language model. Therefore, the second large language model 208b' may evaluate the simulated dialogue between the first large language model 208a' and the third large language model 208c', and may evaluate the responses from the third large language model 208c' in the simulated response.

The third large language model 208c' can be updated based on the simulated dialogues and the evaluated responses. For instance, the simulated dialogues between the first large language model 208a' and the third large language model 208c', and the evaluation performed by the second large language model 208b of the third large language model's 208c' responses in the simulated dialogues may be provided to the third large language model 208c'. The third large language model 208c' can be fine-tuned using direct preference optimisation. In this manner, the third large language model 208c' may learn from the simulated dialogues and the evaluated responses. Thus, the third large language model 208c' may adapt its outputs and improve its outputs based on the learning. Accordingly, when dialogue system outputs comprise outputs from the third large language model 208c', the dialogue system outputs may be improved.

When a user 202 initiates a dialogue 210 with the dialogue system 208', inputs from the user 202 can be provided to the third large language model 208c'. The third large language model 208c' may respond to the inputs from the user 202, thereby generating the dialogue 210. The dialogue 210 can be used to further update the first large language model 208a'. For instance, the first large language model 208a' can be updated using supervisory fine-tuning and based on dialogue 210. In this manner, the first large language model 208a' can continue to learn and improve.

As noted above, the second large language model 208b' evaluates responses from the third large language model 208c' in a simulated dialogue. However, in some instances, the second large language model 208b' may evaluate responses from the third large language model 208c' in real-time. For example, during the dialogue 210 with user 202, the second large language model 208b' can evaluate the dialogue system outputs (e.g., output from the third large language model 208c'). In this example, the second large language model 208b' may identify that dialogue system outputs such as for example, "[m]hmm, Take your time," or "[u]mm . . . Could you repeat that number?", are bad responses. This evaluation can be used by the third large language model 208c' to further learn and improve the dialogue system output.

The second large language model 208b' can be updated using supervisory fine-tuning. For instance, the second large language model 208b' may be updated at regular intervals, or as and when an update may be needed. Feedback from a human manager, such as for example, human manager 204 can be used to update the second large language model 208b' For example, human manager 204 may grade one or more dialogues between the dialogue system 208' and users (e.g., user 202) of the dialogue system 208'. As an example, human manager 204 may evaluate the dialogue 210, and may grade the dialogue system outputs in the dialogue 210. Feedback from the human manager 204 can be provided to the second large language model 208b'. The second large language model 208b' can be updated (e.g., using supervisory fine-tuning) based on the grading provided by the human manager 204. In some instances, a user of the dialogue system, such as for example, user 202 may also grade a dialogue system output. This grading can be provided to the second large language model 208b' to further improve the second large language model 208b'. In this manner, the second large language model 208b' can continue to learn and improve.

Accordingly, the dialogue system 208' is a self-learning and self-improving dialogue system. Other than for occasional feedback from the human manager 204 to update the second large language model 208b' (if need be), the dialogue system 208' learns, adapts, and improves by itself. As seen in FIG. 2 and from the description above, the parameter(s) and/or configuration of the third large language model 208c' can be updated to provide improved dialogue system outputs without human intervention. Furthermore, the first large language model 208a' can be trained and instructed to generate a diverse volume of emulated user inputs for the simulated dialogues.

Accordingly, the third large language model 208c' can be updated based on a diverse volume of data. The first large language model 208a' facilitates for faster and efficient process of accumulating data for updating the third large language model 208c' Additionally, the second large language model 208b' can evaluate the outputs from the third large language model 208c' in a consistent manner, thereby providing consistent evaluation and annotation. Furthermore, the second large language model 208b' can replace human managers (e.g., human annotators) in traditional dialogue systems that supervise each output from the third large language model 208c'. Accordingly, the second large language model 208b' facilitates consistent, scalable, and cost-efficient evaluation of outputs from the third large language model 208c'. The combination of the models described herein facilitate the dialogue system 208' to provide improved dialogue system outputs (e.g., with improved accuracy or improved preferability).

Example System

Figure 3:
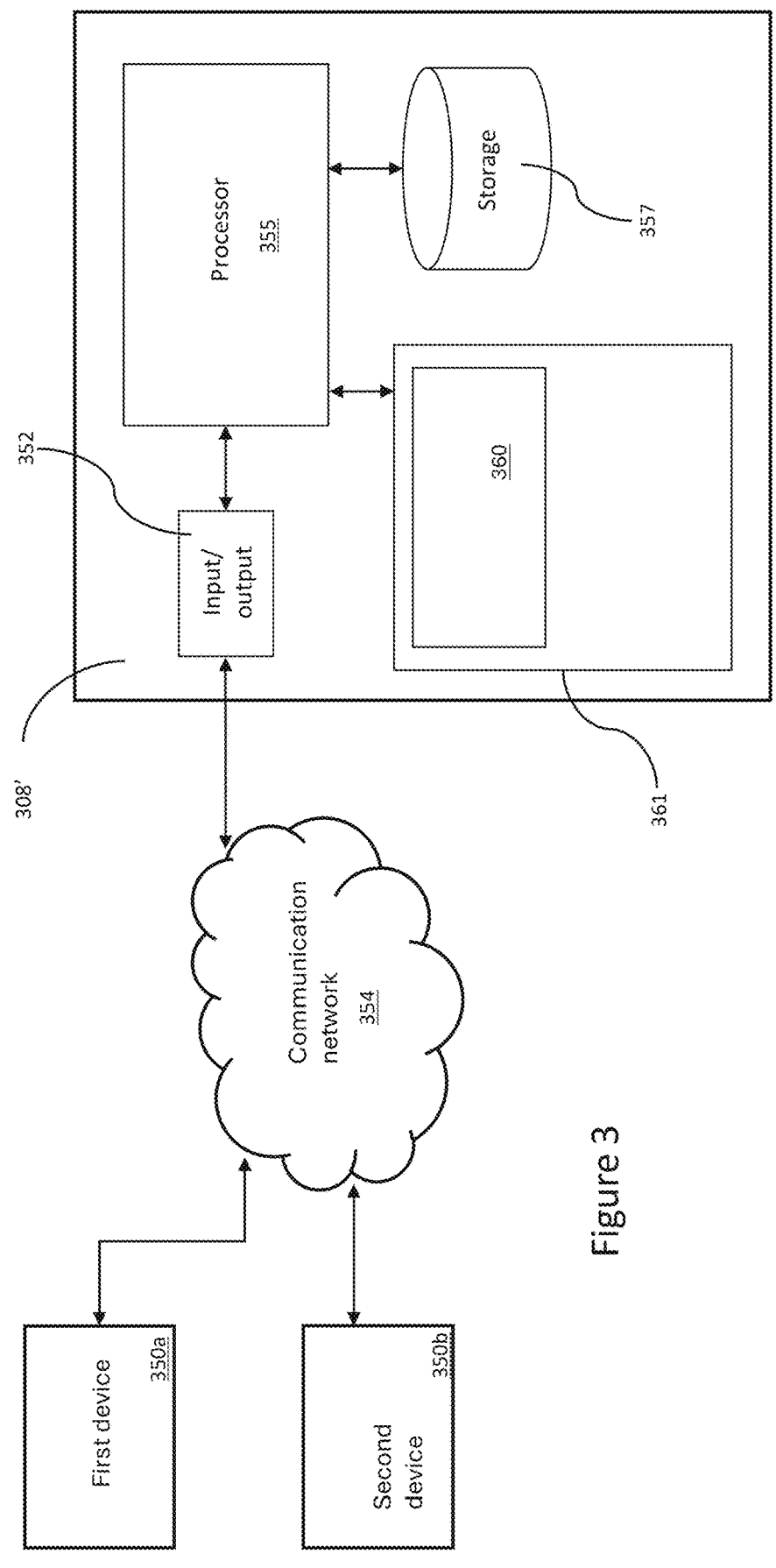
FIG. 3 is a schematic illustration of a system comprising a dialogue system, according to an example.

FIG. 3 is a schematic illustration of a system comprising a dialogue system 308', a first device 350a, and a second device 350b, according to an example. The dialogue system 308' can be configured to communicate with the first device 350a and the second device 350b via a communication network 354 (e.g., Internet). In this example, the first device 350a and the second device 350b communicate with the dialogue system 308' through the same communication network 354. But, in other examples, the first device 350a and the second device 350b may communicate with the dialogue system 308' via different communication networks. For example, the first device 350a may communicate with the dialogue system 308' via a telephone network.

The first device 350a can be configured to provide output to a first user and receive input from a first user. In this example, the first user provides spoken inputs (e.g., audio inputs) to the first device 350a and the first device 350a provides audio outputs to the first user. The first device can be any suitable computing device such as for example, computers (e.g., desktops, personal computers, laptops, etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.). In some examples, the first device can be a telephone that is configured to receive and output audio. The first device 350a can comprise a microphone for receiving audio inputs from the first user and a speaker for outputting audio outputs to the first user.

Where the first device 350a is a computing device, the first user may interact with the dialogue system 308' through a web-based portal or through an application (e.g., online web-based chat applications, SMS, WhatsApp®, etc.) running on the first device 350a. For example, the first user may access a web-based portal in a web browser running on the first device 350a or through an application running on the first device 350a. The first user can provide spoken inputs through the web browser or the application. The audio signal can then be processed and the data can be sent from the first device 350a to the dialogue system 308' over the communication network, using Voice over Internet Protocol (VoIP). Data received from the dialogue system 308' at the first device 350a over the communication network 354 can then be processed and provided as an audio output to the first user through the web-browser or the application.

Although here an example is described in which the dialogue system 308' interacts with the first user through audio, it should be noted that the dialogue system 308' can be configured to interact with the first user with one or both of text and audio signals. Working with text (and not only audio) can allow, for example, hearing impaired and mute people to also use the dialogue system 308'. The first device 350a may therefore additionally or alternatively comprise a keyboard for receiving text inputs from the first user and a screen for displaying text outputs to the first user, or a touchscreen for receiving text inputs and displaying text outputs for example.

FIG. 3 depicts a single first user solely for illustrative purposes. It should be readily understood that any number of first users can interact with the dialogue system 308' through a communication network using a corresponding first device.

The second device 350b can be configured to provide output to a second user (e.g., a human manager such as human manager 204 in FIG. 2) and to receive input from a second user. The second device 350b can be any suitable computing device such as for example, computers (e.g., desktops, personal computers, laptops, etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.). The second device 350b can comprise hardware components such as a keyboard, screen and mouse, or a touchscreen, for receiving inputs and displaying outputs to the second user. The second device 350b can provide inputs through a graphical user interface (GUI). For instance, the GUI may be provided through a web-based portal, through an application or as a program that runs on the second device 350b for example, and is displayed on the second device 350b. The input data from the second device 350b can be processed and sent from the second device 350b to the dialogue system 308' via the communication network 354.

The dialogue system 308' in this example can be a server. The dialogue system 308' can comprise an input/output component 352, a processor 355, a working memory 361, and a storage 357. In some examples, the server may be configured to run on a cloud platform (e.g., Microsoft Azure®, Amazon® web services, IBM® cloud computing, etc.).

The processor 355 can be coupled to the storage 357 and can access the working memory 361. The processor 355 may comprise logic circuitry that responds to and processes the instructions in code stored in the working memory 361. In particular, when executed, a dialogue program 360 can be represented as a software product stored in the working memory 361. The dialogue program 360 will be described in more detail in relation to FIG. 4. Execution of the dialogue program 360 by the processor 355 can cause examples as described herein to be implemented.

The processor 355 can also access the input/output component 352. The input/output component 352 may be a single component or may be divided into a separate input component and output component. Furthermore, multiple input or output components may be provided for receiving and sending different inputs and outputs. The input/output component 352 can be configured to receive data transmitted through the communication network and output data to be transmitted through the communication network.

In particular, input data from the first device 350a may correspond to audio (and/or to text input). This data can be received through the input/output component 352 and processed by the dialogue program 360 through a first interface 472a, which will be described below. A first user of the first device 350a may interact with the dialogue program 360 by providing an audio input and/or text input in order to access a chat-based search, recommendation, or booking service provided by the dialogue system 308' for example. Output audio data and/or output text generated by the dialogue system 308' can be provided through the first interface 472a to the input/output component 352 and transmitted to the first device 350a through the communication network 354.

Input data from the second device 350b can also be received through the input/output component 352 but may be processed by the dialogue program 360 through a second interface 472b, which will be described below. A second user (e.g., a human manager) of the second device 350b can interact with the dialogue program 360 by providing inputs (e.g., feedback) through a GUI that facilitate the dialogue program 360 to provide improved outputs. The dialogue system 308' may communicate with further devices and systems over the communication network. Although in this example, interaction with a second device 350b allowing a second user (for example a human manager) to provide feedback is shown, in other example systems the dialogue system 308' does not include the second interface 472b, and interacts only with users of the system such as the first user.

The processor 355 can also be configured to communicate with the non-volatile storage 357. The storage 357 may contain data that is used by the dialogue program 360 when executed by the processor 355. As illustrated, the storage 357 can be local memory that is contained in a device. Alternatively however, the storage 357 may be wholly or partly located remotely, for example, using cloud based memory that can be accessed remotely via the communication network 354. The dialogue program 360 may be stored in the storage 357. The dialogue program 360 may be placed in working memory when executed.

As illustrated, the system 308' comprises a single processor. However, the dialogue program 360 may be executed across multiple processing components, which may be located remotely, for example, using cloud based processing. For example, the dialogue system 308' may comprise at least one graphics processing unit (GPU) and/or tensor processing unit (TPU) and a general central processing unit (CPU), wherein various operations described in relation to the methods below are implemented by the GPU or TPU, and other operations are implemented by the CPU. For example, matrix operations or vector operations may be performed by a GPU or TPU. For example, tasks performed by large language models as described herein may be performed by a GPU or TPU.

Usual procedures for the loading of software into memory and the storage of data in the storage unit 357 apply. The dialogue program 360 can be embedded in original equipment, or can be provided, as a whole or in part, after manufacture. For instance, the dialogue program 360 can be introduced, as a whole, as a computer program product, which may be in the form of a download, or can be introduced via a computer program storage medium, such as an optical disk. For example, the computer program may be downloaded on the first device 350a from a digital distribution platform such as app store or application store (e.g., Chrome® web store, Apple® web store, etc.). Additionally or alternatively, the first device 250a may render a web browser (e.g., Mozilla®, Google®, Safari®, Internet Explorer®, etc.). The web browser may include browser extensions, browser plug-ins, etc. that may render the computer program on the first device 350a. Modifications to existing software can be made by an update, or plug-in, to provide features of the above described example.

While it will be appreciated that the below examples are applicable to any computing system, the example computing system 308' illustrated in FIG. 3 provides means capable of putting an example, as described herein, into effect.

Figure 4:
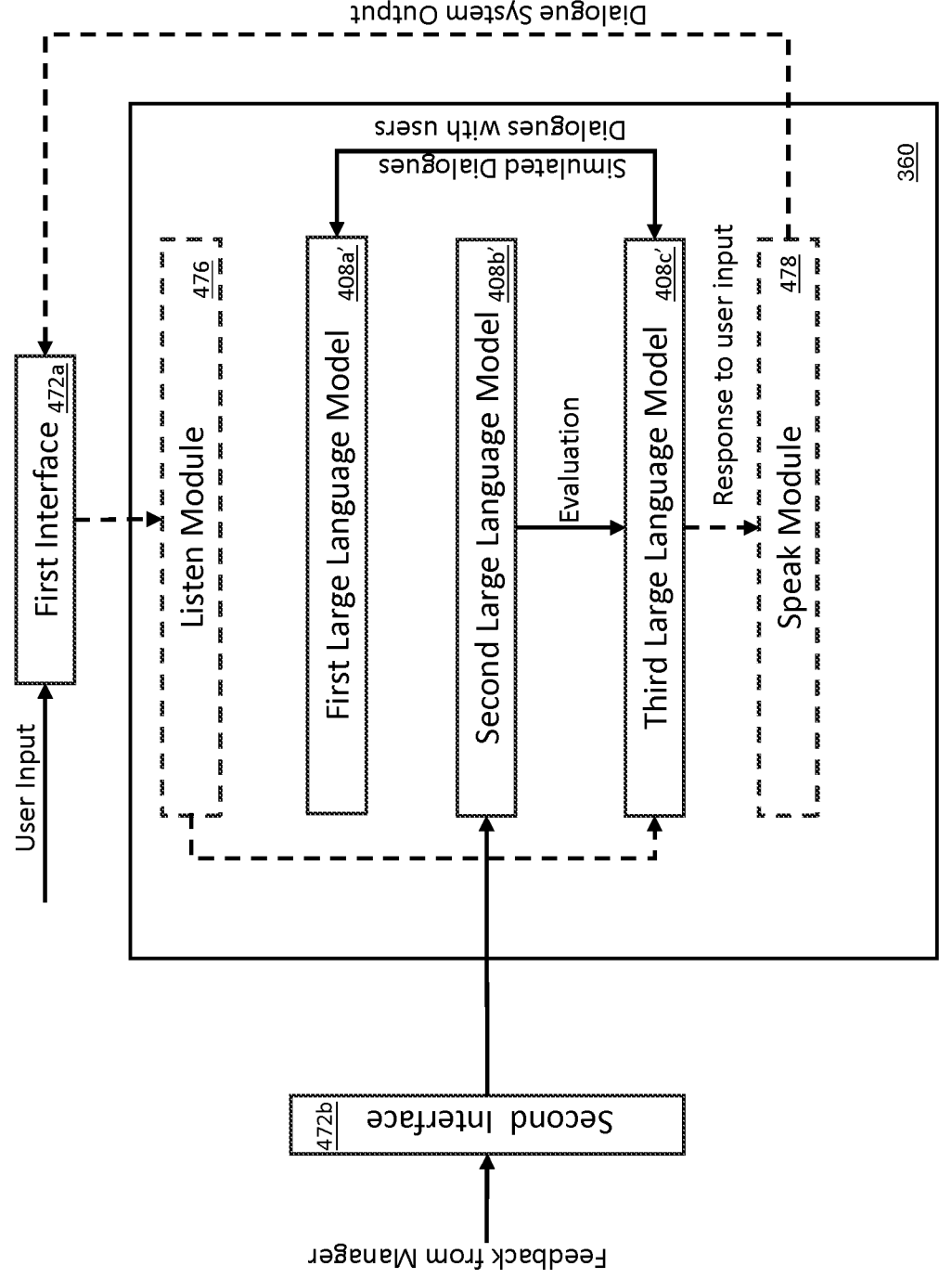
FIG. 4 shows a schematic illustration of functional modules or units of a dialogue program which may be used in a dialogue system, according to an example.

FIG. 4 shows a schematic illustration of various functional modules or units of a dialogue program 360 which may be used in a dialogue system 308' according to an example. The modules may be implemented as one or more computer programs. An example computer program can comprise a set of instructions that can be executed by a processor such as for example, processor 355. For example, all of the modules may be components of a single computer program. As another example, each of the modules may be implemented as individual computer programs communicating so as to provide the described functionality. As another example, a subset of the modules may be implemented as one computer program and the other modules may be implemented as one or more other computer programs. In some examples, the processor 355 may comprise instructions and/or software code to execute the modules described in FIG. 4. The instructions and/or software code may include separate calls to separate modules. In some examples, a call to one module may redirect the processing performed by the processor 355 to implement that module. In some examples, the processor 355 may be configured to execute each module in a series one after the other. Alternatively, the processor 355 may execute two or more modules simultaneously. The modules and their functions are described in detail below.

The dialogue program 360 that is used by the dialogue system 308' can comprise a first large language model 208a', a second large language model 408b', and a third large language model 408c'. In some examples, the dialogue program 360 may optionally comprise a listen module 476 and a speak module 478.

The dialogue program 360 can receive, by way of first interface 472a, an input signal relating to speech, text, or a combination of both, provided by a first user. The dialogue program 360 can process the input signal, determine a dialogue system output based on the processing, and output the dialogue system output, by way of the first interface 472a, to the first user. The dialogue system output can be speech information, text information, or a combination of both.

The first interface 472a may include a frontline service that receives Voice over Internet Protocol (VOIP) traffic and converts received data into media streams. In particular, the first interface 472a can receive encoded digital signals and convert them to an audio file. Additionally or alternatively, the first interface 472a can be configured to redirect media streams, voice commands, text commands, transcriptions, and instructions to modules of the dialogue program 360. For example, the first interface 472a may redirect an audio file corresponding to the received input signal to the listen module 476. In another example, the first interface may redirect a text file corresponding to the received input signal to the third large language model 408c'.

The first large language model 408a' can be configured to interact with and/or engage with the third large language model 408c' so as to produce simulated dialogues. The second large language model 408b' can be configured to evaluate outputs from the third large language model 408c'. The second large language model 408b' may further be configured to annotate whether an output from the third large language model 408c' is a preferable output or a not preferable output. The third large language model 408c' can be updated (e.g., fine-tuned) based on the simulated dialogues and the evaluation of the outputs. In response to the input signal received via the first interface 472a, the third large language model 408c' can generate an output to be outputted as a dialogue system output.

The first large language model 408a' can be updated (e.g., fine-tuned) based on subsequent dialogues between the first user and the dialogue program 360. The second large language model 408b' can be updated (e.g., fine-tuned) based on feedback from a human manager, received via a second interface 472b, and/or based on feedback from the first user, received via the first interface 472a. The second interface 472b may be a web-based application and/or a graphical user interface that may allow a human manager to annotate outputs from the third large language model 408c'.

Listen Module

In examples in which the dialogue program 360 receives an audio file corresponding to a received input signal, the first interface 472a can redirect the audio file to the listen module 476. The listen module 476 can comprise a speech recognition module and a spoken language understanding module. The speech recognition module can transcribe the audio file (e.g., corresponding to the received input signal) into text. The speech recognition module can comprise one or more automatic speech recognition (ASR) models to perform automatic speech recognition. The ASR models can be configured to generate a text signal from the audio file. In this example, the ASR models can be structurally and/or functionally similar or identical to the ASR models described in U.S. Pat. No. 11,430,446, which is hereby incorporated by reference in its entirety. Additionally or alternatively, the ASR models can be any suitable pre-trained general purpose ASR model, such as for example, Nvidia® RIVA, Google® ASR model, Amazon® ASR model, Deepgram® ASR model, a combination thereof, and/or the like.

Generally, the ASR models included in the speech recognition module can be trained to output an N-best list of text transcriptions corresponding to the audio file (e.g., corresponding to the received input signal), where N is a positive integer greater than or equal to 1. For instance, the ASR models can be trained to assign posterior probabilities to words in a given input signal. The full posterior distributions over the ASR hypotheses may be approximated by returning the top N most probable text hypotheses, optionally with their respective probabilities. The ASR models can output a list of N text sequences, which are the N most probable text sequences corresponding to the input signal. Thus, the ASR models can output an N-best list of text transcriptions corresponding to the input signal. In this example, the ASR models can be trained to perform one or more of the following: (a) contextual biasing; (b) numeric or alphanumeric recognition; (c) accent recognition; (d) language recognition; (e) probability boosting of certain words and/or word patterns; (f) corrections to the list of N text sequences; (g) phenome matching; (h) result aggregation; and/or (i) a combination thereof.

In some examples, the one or more ASR models are used together with a voice activity detection (VAD) module. The one or more ASR models only process portions of the input signal that are identified as voice by the VAD module. This provides improved latency, by removing unnecessary parts from the input audio signal prior to processing by the one or more ASR models.

The spoken language understanding (SLU) module is an optional module. The spoken language understanding module comprises a collection of algorithms and machine learning models that can recover information from incorrect speech transcriptions coming from the speech recognition module, using context and user information to infer the correct text corresponding to the user input. Accents, background noise, recognition errors, domain specificities, and particular named entities may make voice difficult to transcribe. The SLU module comprises a collection of algorithms that operate on the output of the speech recognition module, or together with the speech recognition module in order to improve the captured semantics from the user input.

The SLU module can recover names (such as Hernandez). The SLU module can bias phonetically similar words contextually (in the context of restaurant bookings, the word 'eight' is much more likely than a phonetically similar word 'hate'). The SLU module may use techniques to support different ways people speak when they need to convey certain alphanumeric codes (e.g., to support NATO alphabet, the user can say 'double eight') and those alphanumeric codes can be normalised to the final format that is processed further (e.g., as part of an ID&V module or as part of checking the membership against some database of member records).

For example, the spoken language understanding module may comprise an alphanumeric parsing sub module. An example alpha-numeric parsing submodule is described in U.S. Pat. No. 11,537,661, incorporated herein by reference in its entirety. Such a submodule performs alphanumeric parsing and normalisation. For example, a set of one or more pre-defined regular expressions may be used to select a character sequence from a list of candidate text sequences (e.g. the N-best list) output from the speech recognition module. For example, when a 4 letter code is being sought, a suitable regex would be "[A-Za-z] [A-Za-z] [A-Za-z] [A-Za-z]". Here, "[A-Za-z]" means any uppercase characters from "A" to "Z" or any lower case characters from "a" to "z". Another example is for obtaining a UK postcode where the 3rd and 5th characters are normally a number. In this case, the regex may be: "[A-Za-z] [A-Za-z] [0-9] [A-Za-z0-9] [0-9] [A-Za-z] [A-Za-z]". Using the regular expression to extract only valid alphanumeric inputs means that the extraction is robust to noisy speech recognition. Additionally or alternatively, a transcript post-processing step may be performed to processes each candidate returned by the speech recognition module. The transcript post-processing step comprises applying a set of one or more rules to the output of the speech recognition module, i.e. the N-best list. The one or more rules may include: normalising into a common format by substituting one or more specific words with corresponding characters; correcting common ASR errors back to letters or words; substituting expressions denoting double characters or triple characters by their individual characters; filtering filler words that commonly occur in ASR; processing letter-for-word spelling; and processing NATO spelling. For example, the alphanumeric parsing sub module may receive an output of the speech recognition module "Apple Charlie Echo double eight 0 for 7" and replace it with the text "ACE88047".

In this manner, if the transcribed text (e.g., output from speech recognition module) is incorrect, the spoken language understanding module can recover information from the incorrectly transcribed text.

Typically, accents, background noise, domain specificities, etc. can make it difficult to extract information from audio files. The listen module 476 (e.g., the speech recognition module and the spoken language understanding module) can be configured to transcribe the audio file to text in a robust manner. For example, the listen module 476 can perform contextual recognition, alphanumeric parsing, and identification of N-best list of text transcriptions.

For instance, the listen module 476 can recognize and correct names such as for example, correcting "an Indus" to "Hernandez". For example, the ASR models may be trained to recognize names and correct user input from the first user for names. The listen module 476 may also be configured to bias phonetically similar words contextually. In this example, a first user interacts with the dialogue system to reserve a table at a restaurant. The listen module 476 (e.g., the ASR models described herein) can perform contextual biasing on the first user input "Actually, can you make that hate people?" to detect that the word "hate" is phonetically similar to "eight", and that the word "eight" is more likely to be appropriate given the context. The listen module 476 can also support alphanumeric codes in the user input. In this example, the user input includes a NATO alphabet "double eight". The ASR models described herein may perform alphanumeric recognition to normalise the alphanumeric codes to a final format, such as for example, "double eight" to "88". The listen module 476 may be configured to improve the performance of the ASR models described herein. For instance, the listen module 476 may perform model ensembling to select the output "Unfortunately, I have lost my card" from multiple possible outputs. Although in the examples here, the input signal corresponds to an audio file it should be understood that where the user input is provided as text, the listen module 476 may not be included in the system.

An example method for transcribing an audio file that is based on input signal using the listen module 476 and feeding the transcribed text from the listen module 476 to the large language models may comprise pre-processing and biasing of the audio file that corresponds with the input signal. For instance, the listen module 476 may perform accent neutralization of the audio in the audio file, and biasing of the audio in the audio file. More specifically, the listen module may be fine-tuned to a wide spectrum of accents. By enabling the listen module to support a variety of accents allows the listen module to neutralise diversity in accents. The listen module 476 can apply ASR models to process the audio file and transcribe the audio file to text. The listen module 476 can perform post processing, such as for example, identifying N-best list of text transcriptions, performing phenome matching, and performing results aggregation. This step is performed by the SLU module.

An ASR model may assign posterior probabilities to words in an utterance given the input signal. The N-best list selection module output then takes the form of an N-best list, which approximates the full posterior distributions over the ASR hypotheses by returning the top N most probable text hypotheses, optionally with their respective probabilities. The audio user input is provided to the selected ASR model(s), and the output from the selected ASR model(s) is provided to the N-best list selection module, which outputs a list of N text sequences, which are the N most probable text sequences corresponding to the audio input.

A first ASR model in the set of models may be configured to recognise an alphanumeric character sequence with improved accuracy. For example, the first ASR model may be trained using a training dataset comprising a larger proportion of alphanumeric sequences. A second ASR model may be configured to recognise a numeric sequence with improved accuracy. For example, the second ASR model may be trained using a training dataset comprising a larger proportion of numeric sequences. A third ASR model may be configured to recognise words spoken with an American accent with improved accuracy. For example, the third ASR model may be trained using a training dataset comprising a larger proportion of words spoken in an American accent. A fourth ASR model may be configured to recognise words spoken with an English accent with improved accuracy. For example, the fourth ASR model may be trained using a training dataset comprising a larger proportion of words spoken in an English accent. A plurality of language specific ASR models, corresponding to different languages, may also be included in the set of models. A different ASR model may be set by the model selection for a dialogue turn. For example, if a particular input type (e.g. an alphanumeric or numeric-only sequence) is expected for a particular dialogue turn, the ASR model with the highest accuracy on such input types may be set in the turn level configuration settings.

The ASR module may further comprises a bias setting module. The bias module is configured to boost the probabilities that certain words and/or word patterns are recognised in a particular input speech utterance. An ASR model may comprise an acoustic model. The bias module may use word boosting methods, which give each of a set of one or more "words of interest" a higher score when generating text from the output of the acoustic model. The bias module stores a set of one or more "words of interest", together with a weight corresponding to each word of interest. The weights are used to increase the likelihood that sequences of phones which form these "words of interest" are selected. In order to implement word boosting, a set of words of interest and a corresponding weight for each word is provided to the biasing module. The set of words and the weights included in the biasing module are configurable settings of the ASR module. The bias module may also be used to boost the probabilities that certain patterns are recognised. In this case, the bias module stores a set of patterns of interest and corresponding weights.

Contextual biasing may be implemented, in which the set of words and/or patterns of interest, and weights, are configured per dialogue turn. For example, the ASR module may be configured to increase the likelihood that dates are recognised, for dialogue turns when it is expected that the user response will include a date. Contextual biasing allows different words to be boosted depending on the current context. For example, if it is expected to receive an answer to a Yes/No question for the dialogue turn, the list of words of interest will comprise words related to "Yes" or "No" (e.g., 'Yeah", "yep", "correct", "nope", "no" . . . ). If a numerical answer is expected, the list of words of interest will comprise numbers (e.g., "three" (people) over "free" (people) as an example). As another example, the ASR module may be biased so as to increase the likelihood that the details of a particular restaurant are recognised, e.g. if the restaurant name is "Willow Tree Cafe" then the probability that "Willow", "Tree", and "Café" are recognised may be increased. Thus words of interest may also comprise uncommon and infrequently named entities (e.g., names of particular hotels and restaurants that are stored in the knowledge base).

The ASR module may further comprises a phoneme matching module. The phoneme matching module takes as input phonetic units and performs matching at the phonetic level. In this example, one or more of the set of ASR models is configured to additionally output phonetic text. For example, the phonetic text may represent the pronunciation of the one or more audio inputs using a phonetic alphabet, e.g. the International Phonetic Alphabet (IPA) or Speech Assessment Methods Phonetic Alphabet (SAMPA). Characters of phonetic text may be referred to as phonemes. For example, one or more ASR models may perform a first step of generating a phonetic text from the audio signal, and a second step of generating an orthographic text from the phonetic text. Both the phonetic text and the orthographic text are outputted. The N-best list selection may select a list of N possible orthographic texts and the N corresponding phonetic texts. The phonetic texts may then be compared to one or more stored dictionaries in the phoneme matching module. These dictionaries comprise mappings between phonetic text and orthographic text for a set of words. For example, the Serbian name "Mrksic" is often translated into "Milkshake" by an English ASR model. By outputting a phonetic text corresponding to the name "Mrksic", searching the stored dictionaries for this phonetic text, and retrieving a orthographic text corresponding to the phonetic text in the dictionary, such words may be more accurately transcribed.

The ASR module may further comprises a result aggregation module. The results aggregation module may allow the ASR module to operate in an "over-generation" and "ranking" approach, in which multiple models or modules are used on the same input to produce different predictions. These are then assembled by the results aggregation module afterwards to improve the accuracy. For example, they may be ranked in an order of likelihood of correspondence to the input audio.

In some examples, the spoken language understanding module can comprise one or more sub-modules, such as for example a natural language understanding (NLU) module such as described in U.S. Pat. No. 11,430,446, incorporated herein by reference in its entirety. As an example, the spoken language understanding module receives text from the speech recognition module and can extract intent and/or values from the received text, via the NLU sub-module. More specifically, the ASR models described herein can be trained to perform contextualised and biased automatic speech recognition of the audio file (corresponding to the input signal) as discussed above. The spoken language understanding module can be configured to perform contextual recognition to extract values and/or intent (e.g., via the NLU sub-module) from the transcribed text outputted by the ASR models. In examples in which the input signal comprises text instead of audio, the spoken language understanding module can be configured to perform contextual recognition on the text that relates to the input signal so as to extract values and/or intent from the text.

For instance, the NLU sub-module can receive the N-best list of text transcriptions from the ASR module and can extract any slots and values corresponding to the input text. Each dialogue slot corresponds to a subject that a speech signal may relate to, such as the party size for a restaurant booking for example. The dialogue slot may take on one or more "values". The term "value" is used here to refer to any information that fills the slot, and is not limited to numbers—for example the value may be the restaurant name. For example, where the text signal corresponding to the user input is "I would like a table for 4 people please", a value extraction sub-module within the NLU module extracts a "party size" slot with the value "4". The standard value extraction module 83a may use rule-based methods such as template matching or grammar-based methods for example to extract the slot values. Alternatively, data-driven methods can be used, in which statistical models learn from annotated data. Techniques including Inductive Logic Programming, Generative Probabilistic Models, Weighted Finite State Transducers, Support Vector Machines and many others may be used for example. In some examples, a large language model may be uses as a value extractor, for example having a dedicated prompt oriented towards extraction of particular values (such as UK postcodes) or an instruction-tuned large language model may be used to do value extraction. A general-purpose or specialised LLM may be used to perform value extraction, without predefined labels (i.e., without predefined values). The value extraction module may be treated as a sequence labelling problem, where each word in an utterance is labelled. Labelling models such as Conditional Random Fields or Recurrent Neural Networks can be used. An example value extraction method which may be used is described in U.S. Pat. No. 11,132,988B1, "Dialogue system, a dialogue method, and a method of training", the entire contents of which are incorporated by reference herein. In this example, the value extractor model comprises multiple trained models, where each model corresponds to a different slot. The output of each model comprises a sequence of tags corresponding to each token in the input text signal. The parts of the input text signal corresponding to the tokens tagged as corresponding to the slot value are extracted. For slots where the output contains no such tokens, no value is extracted for the slot for the turn. The extracted part of the input phrase for each slot is then normalized to a slot value. This can be performed using a rule-based system. Once a slot value is extracted, this is paired with the slot corresponding to the model, resulting in a slot value pair.

The NLU sub-module can also perform intent classification. For example, the NLU sub-module may classify the text signal (e.g., generated from the audio file), or a part thereof, as corresponding to one of a set of possible user intents. Each of the intents may provide an indication of an operation to perform. An example intent might be that the user wishes to speak to a human operator for example. A general-purpose or specialised LLM may be used to perform intent detection, without predefined labels and classes (i.e., without predefined intents). An intent detection module may comprises an encoder and a classifier. The encoder is a pre-trained sentence encoder. A sentence encoder such as BERT may be used for example. A sentence encoder as described in "ConveRT: Efficient and Accurate Conversational Representations from Transformers, Henderson et al, arXiv:1911.03688v2, 29 Apr. 2020, the entire contents of which is incorporated by reference herein may be used for example. A sentence encoder as described in U.S. Pat. No. 11,210,306B2, "Dialogue system, a method of obtaining a response from a dialogue system, and a method of training a dialogue system", the entire contents of which is incorporated by reference herein, may be used for example. The encoder outputs a vector representation for the input text. This is taken as input to the classifier model. The classifier model may be a multi-layer perceptron model. The classifier model outputs a probability that the input vector representation corresponds to each of a set of two or more intents. In other words, the classifier is a multi-class classifier. For example, the Multi-Layer Perceptron (MLP) comprises one hidden layer with ReLU non-linear activations, followed by an output layer with a softmax activation function for multi-class classification. The dimension of the output layer corresponds to the number of classes—i.e. the number of possible intents. The value of each element in the output vector corresponds to the probability that the input text corresponds to the particular intent. The MLP model is trained separately to the encoder. A general MLP model may be trained using an intent detection dataset. Example such datasets include Web Apps, Ask Ubuntu, or the Chatbot Corpus (described in "Evaluating natural language understanding services for conversational question answering systems", Braun et al, 2017, In Proceedings of SIGDIAL, pages 174-185). The MLP model is trained using the pre-trained encoder to process the input text. The MLP model comprises a number of trainable parameters, including the layer weights and biases. The parameters are initialised as random values. The MLP model is trained using stochastic gradient descent (SGD). A process of updating the parameter values by computing the gradient of a loss function and updating the parameter values using the computed gradient and an optimiser function is performed. A cross entropy loss may be used. During training, the gradient of the loss with respect to each of the trainable parameters of the MLP is determined through back-propagation. The gradient is then used to determine the updated parameters, using the optimiser function.

Although examples of value extraction and intent classification are described, in general, value extraction and intent classification performed by the NLU sub-module may be implemented using one or more finite state transducers (FSTs), a date parsing library, and/or one or more machine-learning models, e.g. one or more neural networks for example.

While in some examples, the spoken language module described herein may be included in the dialogue program 360, in other examples, any suitable spoken language module may be included in the dialogue program 360. Put differently, in these other examples, any suitable model that is trained to extract intent and/or values may be included in the dialogue program. In yet other examples, the dialogue program 360 may not include a spoken language module at all. Instead, in these examples, one or more large language models described herein (e.g., the first large language model 408a', the second large language model 408b', and/or the third large language model 408c') may recognize intent based on inputs from the user. In one example, the output from the listen module 476 can be redirected to the third large language model 408c'.

First Large Language Model

The first large language model 408a' can be an agentic model that autonomously implements natural language understanding and natural language processing capabilities. The first large language model 408a' can incorporate a generative model which may include a transformer architecture (e.g., a transformer encoder, a transformer decoder, etc.), one or more attention layers, one or more recurrent layers, and one or more embedding layers. The first large language model 408a' can be pre-trained to encode input (e.g., input in the form of speech or text) that the model 408a' receives, and generate output predictions (e.g., predicting the next word or next token) so as to perform a language task.

In this example, the first large language model 408a' can include a generative general-purpose large language model such as for example, ChatGPT developed by OpenAI™, Google® Gemini, Anthropic® Claude 3, Mistral or Mixtral series. The first large language model 408a' is trained using training data comprising dialogues between the first user(s) and the dialogue system 308'. For example, the first large language model 408a' may be trained using training data comprising previous dialogues between the dialogue system 308' and the first user(s). The first large language model 408a' can be trained using supervised fine-tuning (SFT).

Figures 5A, 5B:
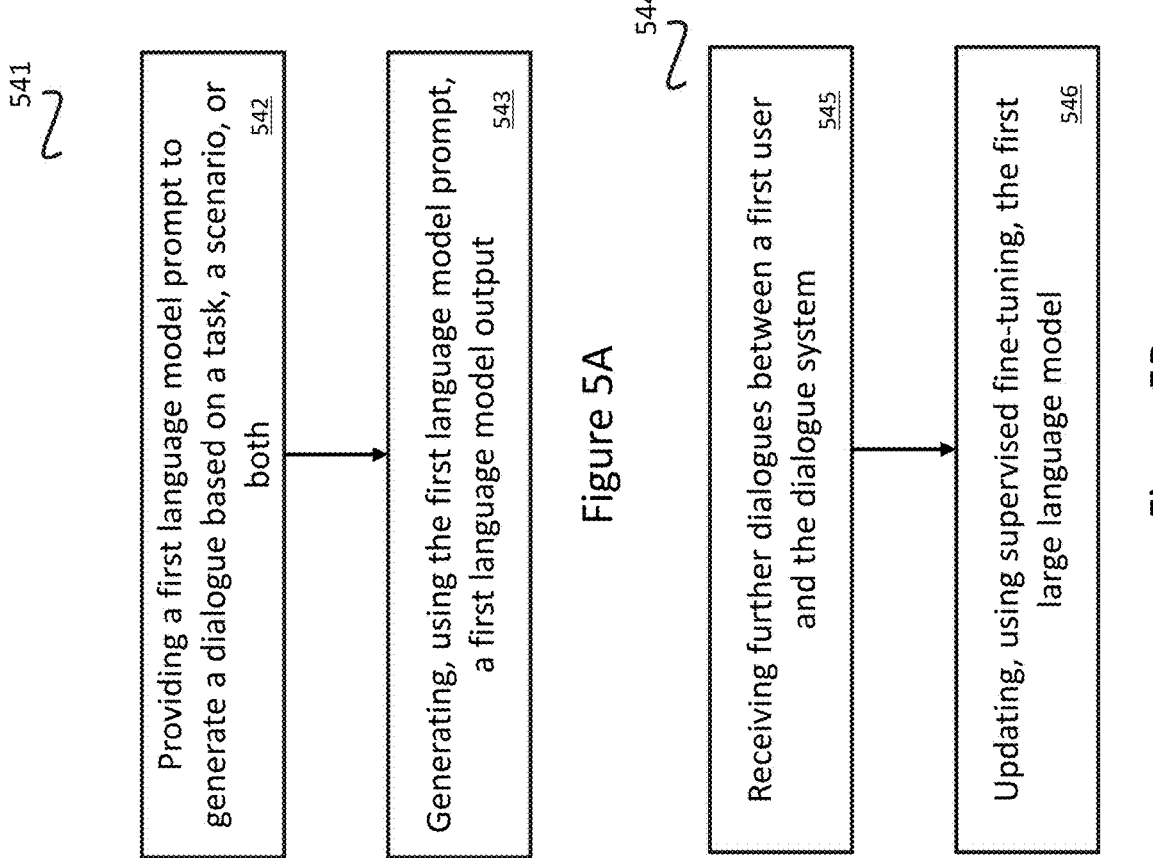
FIG. 5A is a flowchart illustrating a method of generating an output from a first large language model of a dialogue program emulating a persona of a first user, according to an example.
FIG. 5B is a flowchart depicting a method of updating a first large language model, according to an example.

The trained first large language model 408a' can be provided to the dialogue program 360. The first large language model 408a' in the dialogue program 360 can be configured to emulate a persona of one or more first user(s). FIG. 5A is a flowchart illustrating a method 541 of generating an output from the first large language model 408a' emulating a persona of a first user. At step 542, the method 541 comprises providing the first large language model 408a' with a first language model prompt. The first language model prompt can include instructions to guide the first large language model 408a' to generate one or more first large language model outputs based on a task, a scenario, or both. As an example, the first language model prompt may include instructions to guide the first large language model 408a' to emulate a first user of the dialogue system 308' seeking to reserve a table for dinner at a restaurant. The first language model prompt may include instructions relating to the task of reserving a table, with one or more constraints, such as for example, the number of people the table is being reserved for, preferred time for dinner, preferred location, etc., so as to emulate the first user. As another example, the first language model prompt may include instructions to guide the first large language model 408a' to emulate a first user of the dialogue system 308' looking to plan a birthday party. The first language model prompt may include instructions relating to the scenario of planning a birthday party with one or more characteristics of a first user, such as for example, extroverted, large group of friends, etc., so as to emulate the first user. Accordingly, the first language model prompt can include diverse scenarios and/or tasks to generate a diverse volume of data.

At step 543, the method 541 comprises generating, using the first language model prompt, a first large language model output. The first language model output emulates an input from a first user of the dialogue system 308'. Put differently, the first language model output mimics an input from a first user of the dialogue system 308'. This first large language model output may be provided to the third large language model 408c' to generate a simulated dialogue. For example, the first large language output may be provided as an input to the third large language model 408c'. In response, the third large language model may generate a third large language model output, thereby generating the simulated dialogue. In this manner, the first large language model 408a' can be configured to facilitate the generation of a simulated dialogue that mimics a dialogue between a first user of the dialogue system 308' and the dialogue system 308'.

The first large language model 408a' may be updated at predetermined time intervals or as needed. FIG. 5B is a flowchart depicting a method 544 of updating the first large language model 408a'. At step 545, the method 544 comprises receiving further data comprising further dialogues between first user(s) and the dialogue system 308'. The data may be received at predetermined time intervals. For example, the data may be received every few days or every few months. As an example, the data may be received every seven days. In this example, the data comprises dialogues between the first user(s) and the dialogue system 308' in the past seven days. Additionally or alternatively, the data may be received as needed. For example, if the dialogues between the dialogue system 308' and the first users includes a scenario that the first large language model 408a' was not initially trained in, then a need for updating the first large language model 408a' may arise. Accordingly, further data may be provided to the first large language model 408a' to account for the scenario. At step 546, the method 544 comprises updating, using supervised fine-tuning, the first large language model 408a' based on the further data. In this manner, the first large language model 408a' can continue to learn, adapt, and improve.

Second Large Language Model

The second large language model 408b' can be an agentic model that autonomously implements natural language understanding and natural language processing capabilities. The second large language model 408b' can incorporate a generative model which may include a transformer architecture (e.g., a transformer encoder, a transformer decoder, etc.), one or more attention layers, one or more recurrent layers, and one or more embedding layers.

In this example, the second large language model 408b' can include a generative general-purpose large language model such as for example, ChatGPT developed by OpenAI™, Google® Gemini, Anthropic® Claude 3, Mistral or Mixtral series. The second large language model 408b' is trained using training data comprising feedback to dialogue system outputs from a human manager. In one example, the training data may comprise feedback to each dialogue system output in a dialogue between a first user and the dialogue system 308'. In another example, the training data may comprise feedback to select dialogue system outputs in a dialogue between a first user and the dialogue system 308'. In yet another example, the training data may comprise feedback to an entire dialogue. For instance, in this example, the human manager may identify whether the dialogue between a first user and the dialogue system 308' is a good dialogue or a bad dialogue.

Figure 6A:
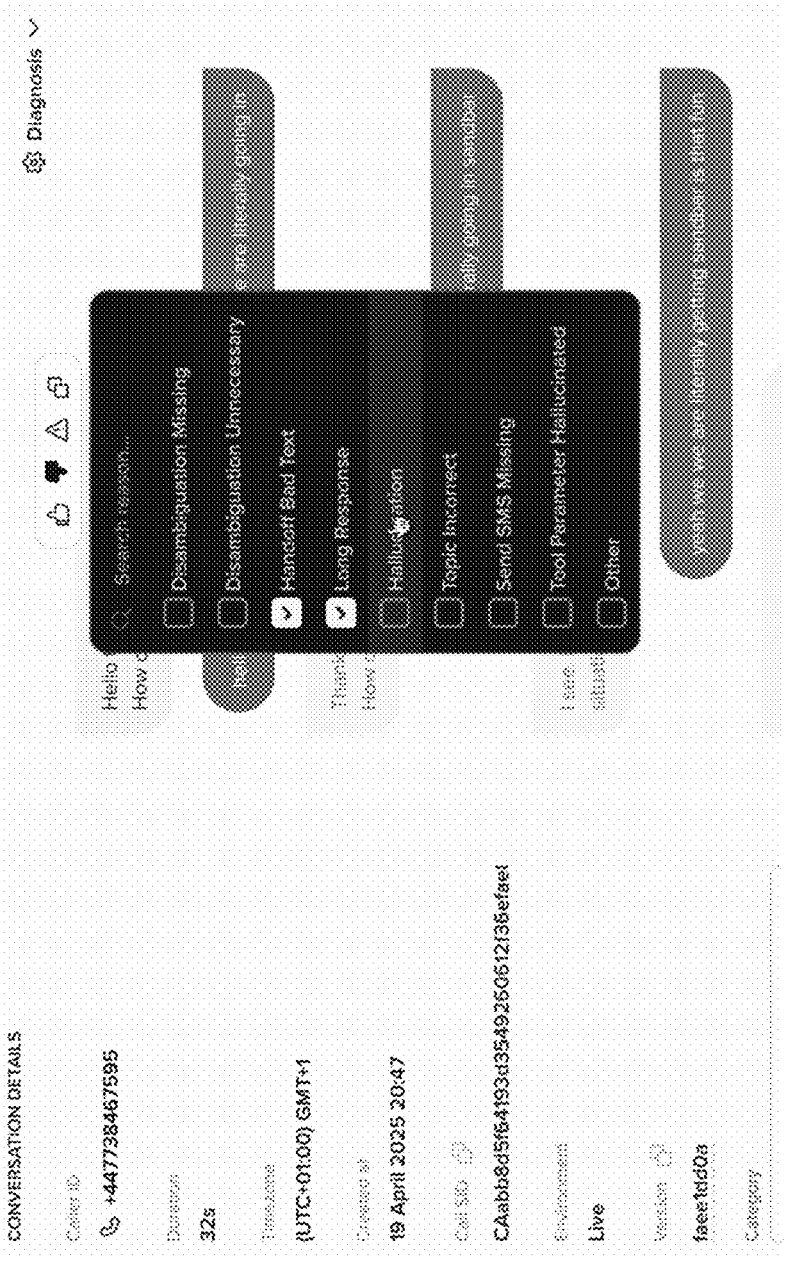
FIG. 6A depicts the ability of a dialogue system to receive negative feedback on a dialogue system output from a human manager, according to an example.

The human manager may provide feedback on the dialogue system outputs via the second interface 472a. The second interface 472a may include a graphical user interface that may be capable of receiving feedback on the dialogue system outputs from the human manager. FIG. 6A depicts the ability of the second interface to receive negative feedback on a dialogue system output from the human manager. As seen in FIG. 6A, the human manager can select a reason for the negative feedback from a drop-down menu. In this example, the feedback is that the text in the dialogue system output is bad text, and that the response is long. Thus, in this example, the training data provided to the second large language model 408b' may comprise the dialogue system output to a user input with an annotation indicating that the output comprises bad text and is too long.

Figure 6B:
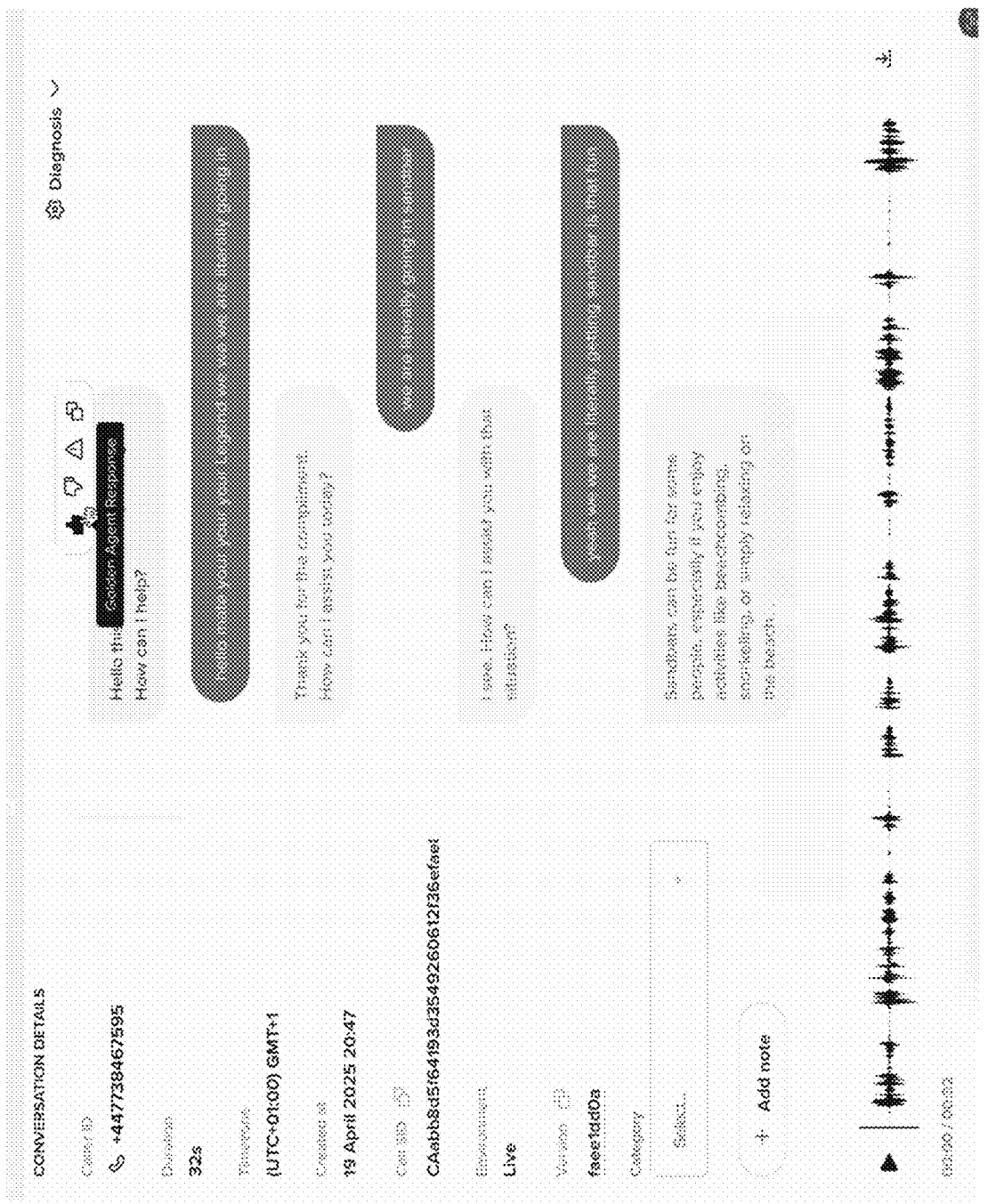
FIG. 6B depicts the ability of a dialogue system to receive positive feedback on a dialogue system output from a human manager, according to an example.

FIG. 6B depicts the ability of the second interface to receive positive feedback on a dialogue system output from the human manager. As seen in FIG. 6B, the human manager can select whether a dialogue system output is good or bad using buttons that indicate a good response or a bad response. In this example, the feedback is that the dialogue system output "[s]andbars can be fun for some people . . . " is a golden response. Thus, in this example, the training data provided to the second large language model 408b' may comprise the dialogue system output to a user input with an annotation indicating that the output is a good response.

Figure 6C:
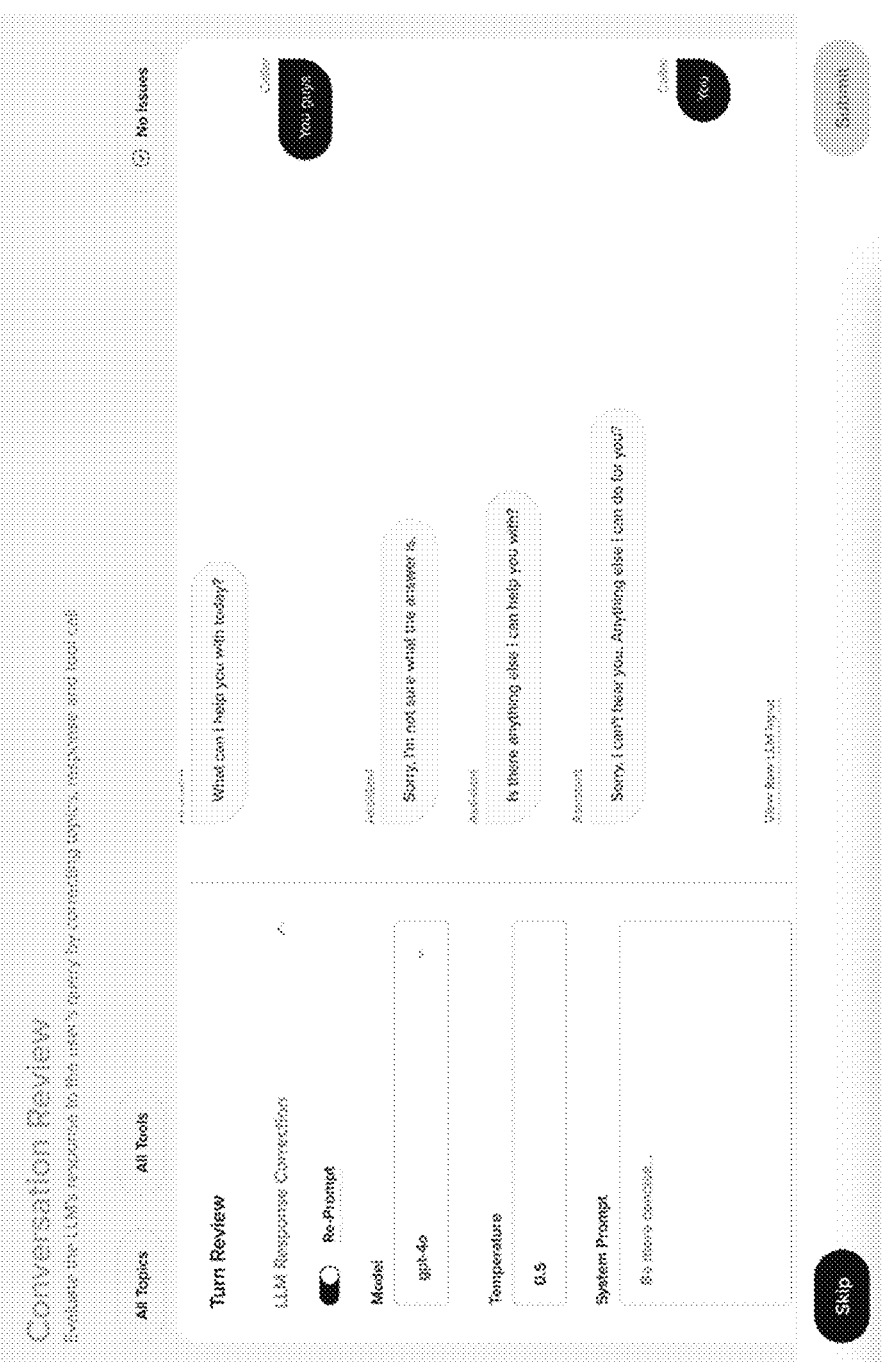
FIG. 6C depicts the ability of a dialogue system to receive instructions from a human manager to regenerate a dialogue system output, according to an example.

FIG. 6C depicts the ability of the second interface to allow a human manager to instruct the dialogue system 308' to re-generate a dialogue system output. As seen in FIG. 6C, the human manager can switch a toggle button to "re-prompt" to indicate that the dialogue system output is to be regenerated. Thus, in this example, the training data provided to the second large language model 408b' may comprise the initial dialogue system output to a user input with an annotation indicating that the dialogue system output is to be regenerated, and the regenerated dialogue system output to the user input.

Figure 6D:
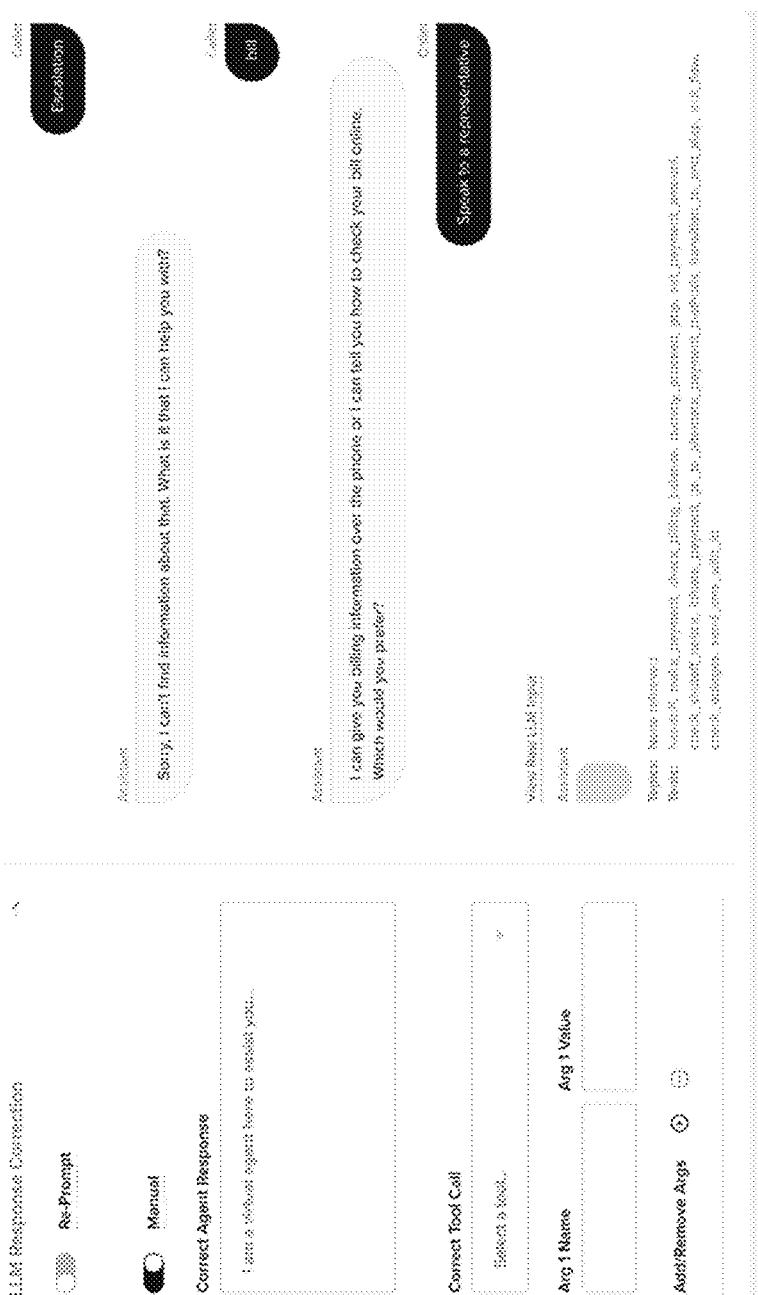
FIG. 6D depicts the ability of a dialogue system to receive a dialogue system output that has been rewritten by a human manager, according to an example.

FIG. 6D depicts the ability of the second interface to allow a human manager to rewrite a dialogue system output. As seen in FIG. 6D, the human manager can correct a dialogue system output. Thus, in this example, the training data provided to the second large language model 408b' may comprise the initial dialogue system output generated by the dialogue system 308' and the rewritten dialogue system output from the human manager.

Figure 7A:
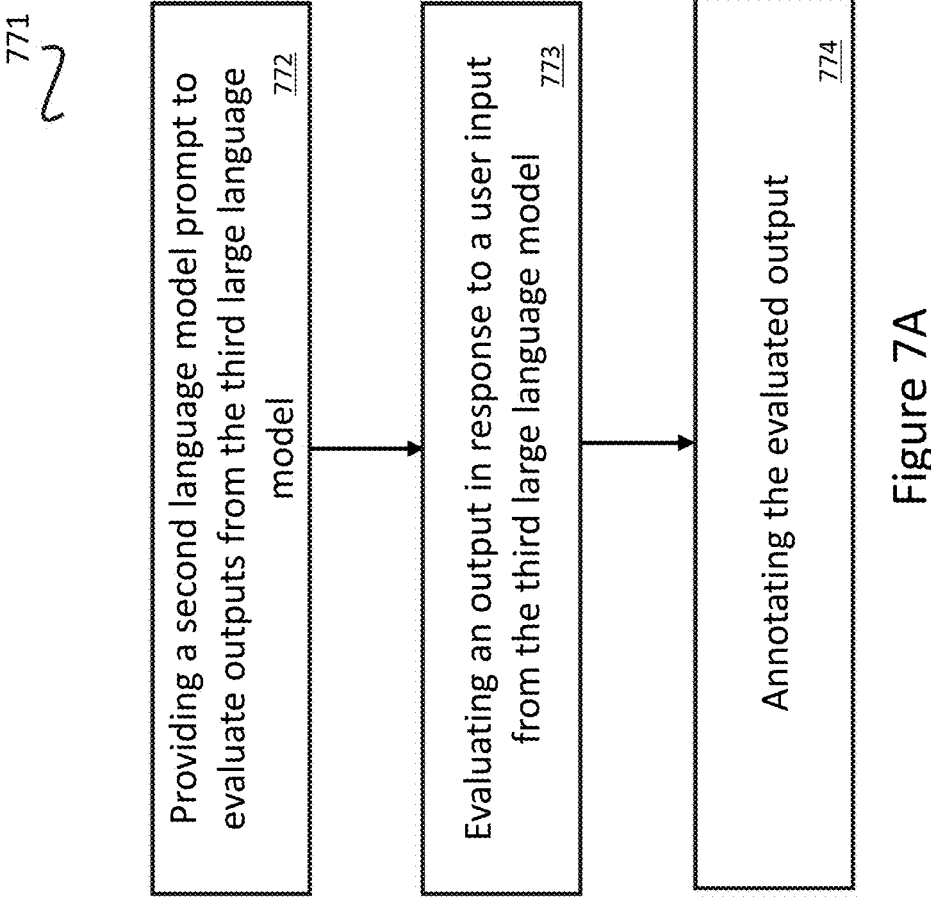
FIG. 7A is a flowchart illustrating a method of evaluating an output from the third large language model, according to an example.

The second large language model 408b' can be trained using supervised fine-tuning (SFT). The trained second large language model 408b' can be provided to the dialogue program 360. The second large language model 408b' in the dialogue program can be configured to evaluate an output from the third large language model 408c'. FIG. 7A is a flowchart illustrating a method 771 of evaluating an output from the third large language model 408c'. At step 772, the method 771 comprises providing a second language model prompt to evaluate outputs from the third large language model 408c'. The second language model prompt can include instructions to guide the second large language model 408b' to evaluate an output from the third large language model 408c'. As an example, the second language model prompt may include rule-based instructions, such as for example, instructions to identify sentences that are long, instructions to identify specific words (e.g., rude words) in sentences, instructions to identify whether the third large language model 308c' initiates a dialogue with a greeting, and/or the like. As an additional or alternative example, the second language model prompt may include instructions to guide the second large language model 408b' to identify outputs that are preferable based on soft skills, such as for example, whether the output is a polite output, whether the output provides a response that the user might be looking for, and/or the like.

At step 773, the method 771 comprises evaluating, based on the second language model prompt, an output from the third large language model 408c'. For example, the second large language model 408b' can evaluate whether an output generated by the third large language model 408c' in response to an input is a good output or a bad output. Evaluating the output can further include comparing two outputs from the third large language model 408c' to a given input. For example, for a given input, the third large language model 408c' can be instructed to generate a first output and then again a second output. The second large language model 408c' can be configured to compare the first output and the second output. The second large language model 408c' can be configured to identify which of the first output and the second output might be a preferable output in response to the given input. At step 774, the method comprises annotating the evaluated output. For example, based on the comparison of the first output and the second output, the second large language model 408b' can annotate which of the two outputs is a preferable output and which of the two outputs is not a preferable output.

As discussed above, the first large language model 408a' can generate simulated dialogues by interacting with the third large language model 408c'. The second large language model 408b' can evaluate the simulated dialogues, and in particular, the outputs from the third large language model 408c' in the simulated dialogues. For example, in response to an output from the first large language model 408a' in a simulated dialogue (i.e., an input to the third large language model), the third large language model 408c' may generate two outputs. The second large language model 408b' can evaluate both the outputs and annotate one of the two outputs as a preferable output and the other of the two outputs as a not preferable output. The annotations are provided to the third large language model 408c' to update the third large language model.

Furthermore, the second large language model 408*b'* can evaluate dialogues between the first users and the dialogue system 308'. For example, during a dialogue with a first user of the dialogue system 308', the third large language model 408*c'* can be instructed to generate two responses to a given input. For instance, for a given input from a first user during a dialogue with the first user, the third large language model 408*c'* may generate two outputs as two possible dialogue system outputs. The second large language model 408*b'* can evaluate both the outputs and annotate one of the two outputs as preferable output and other of the two outputs as not preferable outputs. These annotations can be provided to the third large language model 408*c'*. The third large language model 408*c'* can generate a dialogue system output for the given input based on the annotations. For example, the third large language model 408*c'* may generate the output that is annotated as a preferable output as the dialogue system output for the given input.

In this manner, the second large language model 408*b'* can evaluate third large language model outputs in a simulated dialogue. The evaluation can be provided as training data to the third large language model 408*c'*. Additionally, during a dialogue with the first user, the second large language model 408*b'* can determine an output from the third large language model 408*c'* that is to be outputted as the dialogue system output. In some instances, the second large language model 408*b'* may annotate a preferable output with a thumbs-up and a not preferable output with a thumbs-down. In other instances, the second large language model 408*b'* may annotate a preferable output with a tick mark and a not preferable output with a cross mark. It should be readily understood that other suitable annotations may be possible.

The second large language model 408*b'* can be configured to evaluate an entire dialogue and/or a specific dialogue system output. The evaluation can be configured to be project-specific (e.g., a dialogue system that is configured for reserving tables in a restaurant, a dialogue system that is configured for booking tickets to a concert, etc.) or platform-specific (e.g., all dialogue systems that are configured for all projects).

Figure 7B:
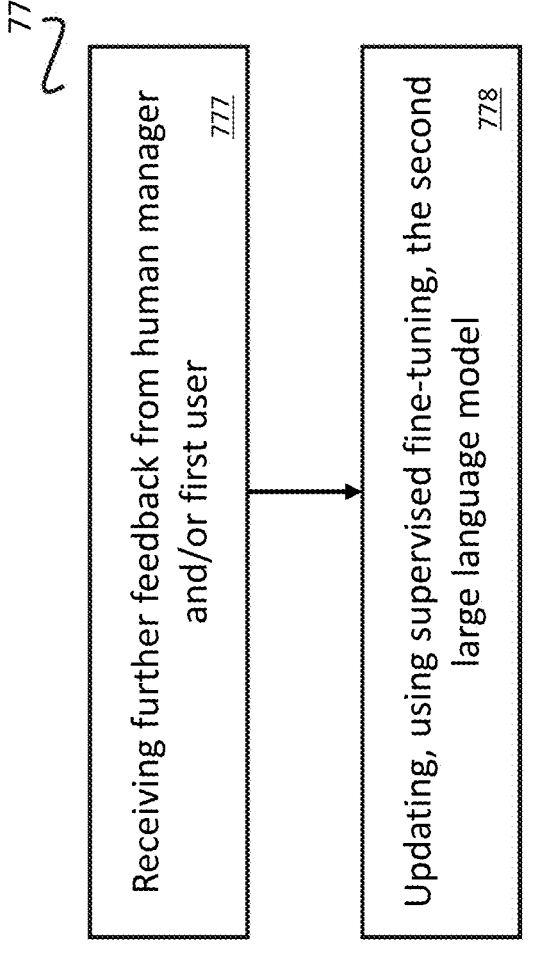
FIG. 7B is a flowchart depicting a method of updating the second large language model, according to an example.

The second large language model 408*b'* may be updated at predetermined time intervals or as needed. FIG. 7B is a flowchart depicting a method 776 of updating the second large language model 408*b'*. At step 777, the method 776 comprises receiving further feedback from the human manager and/or the first user. For example, the second large language model 408*b'* can receive feedback on dialogue system outputs from the human manager. The feedback can be provided via the second interface 472*b* in a manner similar to FIGS. 6A-6D. The human manager may provide feedback on an entire dialogue and/or may provide feedback on select dialogue system outputs in a dialogue. The data for updating the second large language model 408*b'* can comprise this feedback. This data can be received at the second large language model 408*b'* via the second interface 472*b*. Additionally or alternatively, the second large language model 408*b'* can receive feedback on select dialogue system outputs and/or select dialogues from the first user. As an example, if a first user is unsatisfied with a dialogue, the first user may indicate so (e.g., via the first interface 472*a*). The first interface 472*a* can redirect such indications to the second large language model 408*b'* at predetermined time intervals or as needed. As another example, if a first user does not like a dialogue system response in a dialogue, the first user may indicate so (e.g., via the first interface 472*a*). The first interface can redirect such indications to the second large language model 408*b'* at a predetermined time intervals or as needed. The data for updating the second large language model 408*b'* can comprise this feedback.

The data for updating the second large language model 408*b'* may be received at predetermined time intervals. For example, the data may be received every few days or every few months. As an example, the data may be received every seven days. In this example, the data comprises feedback on dialogue system outputs from a human manager and/or feedback on dialogue system outputs from first users in the past seven days. Additionally or alternatively, the data may be received as needed. For example, if there are changes to the project that the dialogue system is being implemented for, then the human manager can provide feedback to account for the changes, and data comprising this feedback can be received at the second large language model 408*b'* to update the second large language model 408*b'*. At step 778, the method 776 comprises updating, using supervised fine-tuning, the second large language model 408*b'* based on the feedback from the human manager and/or the first users. In this manner, the second large language model 408*b'* can continue to learn, adapt, and improve.

Third Large Language Model

The third large language model 408*c'* can be an agentic model that autonomously implements natural language understanding and natural language processing capabilities. The third large language model 408*c'* can incorporate a generative model which may include a transformer architecture (e.g., a transformer encoder, a transformer decoder, etc.), one or more attention layers, one or more recurrent layers, and one or more embedding layers. The third large language model 408*c'* can be pre-trained to encode input (e.g., input in the form of speech or text) that the model 408*c'* receives, and generate output predictions (e.g., predicting the next word or next token) so as to perform a language task.

In this example, the third large language model 408*c'* can be a generative general-purpose large language model that is trained on extensive datasets to perform a wide range of language tasks. For example, the third large language model 408*c'* can be pre-trained on diverse datasets such as for example, text from the Internet, so as to perform a wide range of language tasks (e.g., generate human-like text, answer questions, compose emails, summarize passages, create content in various styles and formats, etc.). Various large language models that are known and can be used as third large language model 408*c'*, such as for example, generative pre-trained transformer (GPT) models (e.g., ChatGPT that was developed by OpenAI™, Google® Gemini, Anthropic® Claude 3, Mistral or Mixtral series).

The third large language model 408*c'* can be configured to generate outputs that may be used as dialogue system outputs. Put another way, the dialogue system outputs may comprise outputs from the third large language model 408*c'*. The third large language model 408*c'* can be configured to engage in one or more dialogues. For example, in response to an input from a first user, the third large language model 408*c'* can generate an output. This output may be provided to the first user as the dialogue system output.

Figure 8:
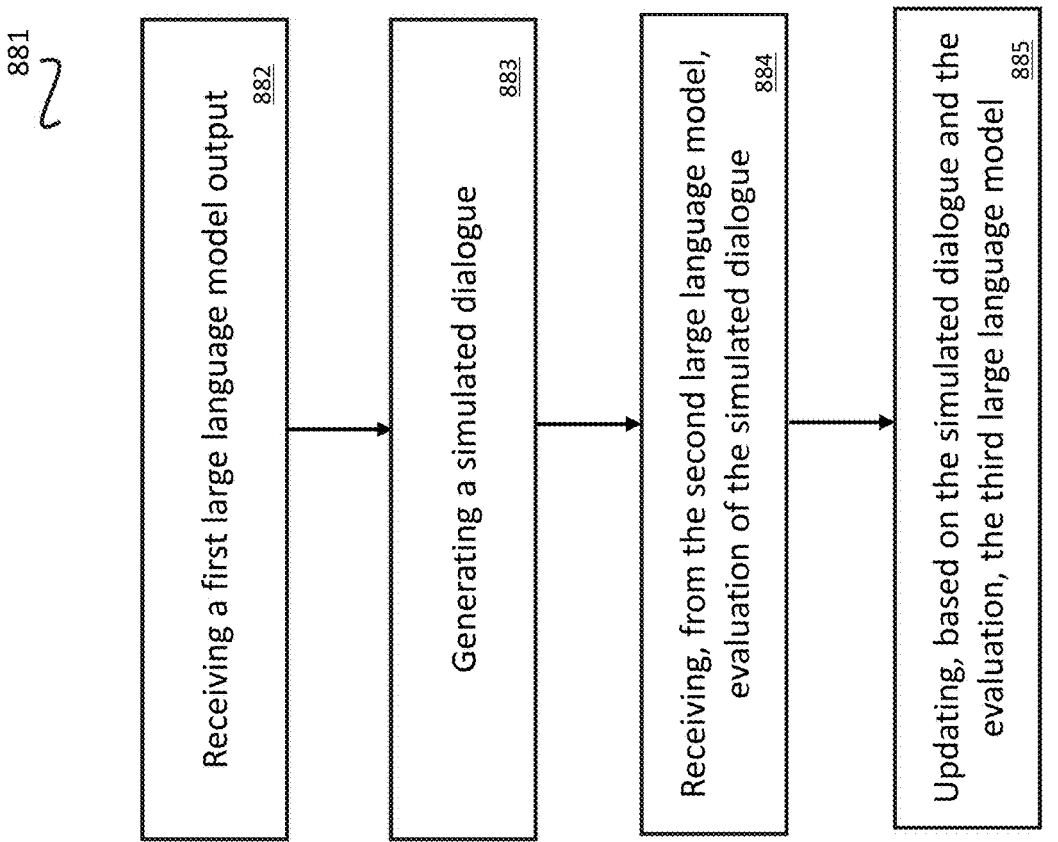
FIG. 8 is a flowchart depicting a method of updating the third large language model, according to an example.

The third large language model 408*c'* may be updated at predetermined time intervals or as needed. FIG. 8 is a flowchart depicting a method 881 of updating the third large language model 408*c'*. At step 882, the method 881 comprises receiving from the first large language model 408*a'*, a first large language model output. As discussed above, the first large language model output can emulate an input from a first user. At step 883, in response to receiving the first large language model output, the method 881 comprises, generating, using the third large language model 408c', a third large language model output. Put differently, at step 883, the third large language model 408c' can generate an output in response to receiving the first large language model output as an input. Thus, a simulated dialogue may be generated between the first large language model 408a' and the third large language model 408c'.

At step 884, the method comprises receiving, from the second large language model 408b', an evaluation of the third large language model output. For instance, the third large language model 408c' can be prompted to generate a first output in response to the output from the first large language model 408a'. Furthermore, the third large language model can be prompted to generate another output (i.e., a second output) in response to the output from the first large language model 408a'. The second large language model 408b' can evaluate the first output and the second output. The second large language model 408b' may compare the two outputs and identify which of the two outputs are preferable. The first output with its corresponding annotation (i.e., preferable output or not preferable output) and the second output with its corresponding annotation (i.e., preferable output or not preferable output) may be sent to the third large language model 408c' at step 884.

At 885, the method comprises updating the third large language model 408c' based on the simulated dialogue and the evaluation of one or more outputs from the third large language model 408c'. Updating the third large language model 408c' can comprise fine-tuning the third large language model 408c' based on direct preference optimisation. In this manner, the third large language model 408c' can continue to learn, adapt, and improve.

Speak Module

In examples in which the first user communicates with the dialogue system 308' via audio, the dialogue program 360 can include a speak module 478. The speak module 478 can process the text generated by the third large language model 408c' and synthesize the text to speech. Accordingly, the speak module 478 comprises a text-to-speech generator. The text-to-speech generator can be any suitable text-to-speech generator such as for example, Google® TTS, Amazon® TTS, ElevenLabs, play.ht, StyleTTS, etc. In some alternative examples, the third large language model 408c' generates a language model output in the form of speech.

In some examples, the speak module 478 may comprise a text-to-speech generator that is pre-trained and/or fine-tuned for the specific intended domain (e.g., hotel booking, etc.) of the dialogue system. Such speak module 478 may be based on non-autoregressive decoding. For example, the speak module 478 may comprise a model that uses parallel non-autoregressive decoding as described in "PHEME: efficient and conversational speech generation", to Budzianowski et al. (https://arxiv.org/pdf/2401.02839.pdf), incorporated herein by reference in its entirety. As another example, the speak module may comprise a model that implements diffusion process such as for example the model described in "StyleTTS 2: Towards Human-Level Text-to-Speech through Style Diffusion and Adversarial Training with Large Speech Language Models", to Li et al. (https://arxiv.org/pdf/2306.07691). Such domain specialized models may be smaller in size than other existing models and may be trained and optimized to improve efficiency and reduce latency.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A computer-implemented method of generating a self-learning and a self-improving dialogue system, the method comprising:

receiving a first language model trained to emulate a persona of a first user of the dialogue system;

receiving a second language model trained to evaluate a first dialogue system output;

generating, using the first language model, a first language model output emulating the persona of the first user of the dialogue system;

providing the first language model output to a third language model, wherein the third language model is trained to generate one or more dialogue system outputs from the dialogue system;

responsive to the first language model output, generating, using the third language model, the first dialogue system output, thereby generating a simulated dialogue between the first language model and the third language model, the simulated dialogue comprising at least the first language model output and the first dialogue system output;

evaluating, using the second language model, the first dialogue system output;

fine-tuning, using the generated simulated dialogue and the evaluation of the first dialogue system output, the third language model; and fine-tuning, based at least in part on a second dialogue system output from the dialogue system and a feedback on the second dialogue system output, the second language model.

2. The method of claim 1, wherein the first language model is trained using supervised fine-tuning and based on one or more dialogues between the dialogue system and the first user of the dialogue system, each dialogue of the one or more dialogues comprising at least one dialogue system input from the first user and at least one dialogue system output from the dialogue system to the first user.

3. The method of claim 1, wherein the first language model is updated at a predetermined time intervals.

4. The method of claim 1, wherein generating the first language model output comprises providing the first language model with a first language model prompt, wherein the first language model prompt includes instructions to guide the first language model to generate one or more first language model outputs based on a task, a scenario, or both.

5. The method of claim 1, wherein the second language model is trained using supervised fine-tuning and based on: a plurality of dialogue system outputs from the dialogue system, and feedback from a human manager to each of the plurality of dialogue system outputs.

6. The method of claim 1, wherein evaluating the first dialogue system output further comprises:

responsive to the first language model output, generating, using the third language model, the first dialogue system output and a third dialogue system output;

comparing, using the second language model, the first dialogue system output and the third dialogue system output; and identifying the first dialogue system output as a preferable dialogue system output of the first dialogue system output and the third dialogue system output.

7. The method of claim 6, further comprising:
annotating, using the second language model, the first dialogue system output as a preferable dialogue system output, thereby generating an annotated first dialogue system output; and
annotating, using the second language model, the third dialogue system output as a not preferable dialogue system output, thereby generating an annotated third dialogue system output,
wherein fine-tuning the third language model comprises providing the third language model with the annotated first dialogue system output and the annotated third dialogue system output.

8. The method of claim 1 further comprising:
receiving a second input from a second user of the dialogue system;
responsive to second input, generating, using the fine-tuned third language model, a third dialogue system output.

9. The method of claim 8, further comprising:
responsive to second input, generating, using the fine-tuned third language model, the third dialogue system output and a fourth dialogue system output;
evaluating, using the second language model, the third dialogue system output and the fourth dialogue system output;
annotating the third dialogue system output as a preferable dialogue system output of the third dialogue system output and the fourth dialogue system output; and
outputting the third dialogue system output to the second user.

10. The method of claim 1, wherein fine-tuning the third language model comprises fine-tuning based on direct preference optimisation.

11. A non-transitory computer readable storage medium comprising computer readable code configured to cause a computer to perform a method comprising the following operations:
receiving a first language model trained to emulate a persona of a first user of a dialogue system;
receiving a second language model trained to evaluate a first dialogue system output;
generating, using the first language model, a first language model output emulating the persona of the first user of the dialogue system;
providing the first language model output to a third language model, wherein the third language model is trained to generate one or more dialogue system outputs from the dialogue system;
responsive to the first language model output, generating, using the third language model, the first dialogue system output, thereby generating a simulated dialogue between the first language model and the third language model, the simulated dialogue comprising at least the first language model output and the first dialogue system output;
evaluating, using the second language model, the first dialogue system output;
fine-tuning, using the generated simulated dialogue and the evaluation of the first dialogue system output, the third language model; and
fine-tuning, based at least in part on a second dialogue system output from the dialogue system and a feedback on the second dialogue system output, the second language model.

12. The non-transitory computer readable storage medium of claim 11, the method comprising further operations:
training, using supervised fine-tuning and based on one or more dialogues between the dialogue system and the first user of the dialogue system, the first language model, each dialogue of the one or more dialogues comprising at least one dialogue system input from the first user and at least one dialogue system output from the dialogue system to the first user.

13. The non-transitory computer readable storage medium of claim 11, the method comprising further operations:
training, using supervised fine-tuning, the second language model, wherein the training is based on: a plurality of dialogue system outputs from the dialogue system, and feedback from a human manager to each of the plurality of dialogue system outputs.

14. The non-transitory computer readable storage medium of claim 11, the method comprising further operations:
responsive to the first language model output, generating, using the third language model, the first dialogue system output and a third dialogue system output;
comparing, using the second language model, the first dialogue system output and the third dialogue system output; and
identifying the first dialogue system output as a preferable dialogue system output of the first dialogue system output and the third dialogue system output.

15. The non-transitory computer readable storage medium of claim 14, the method comprising further operations:
annotating, using the second language model, the first dialogue system output as a preferable dialogue system output, thereby generating an annotated first dialogue system output; and
annotating, using the second language model, the third dialogue system output as a not preferable dialogue system output, thereby generating an annotated third dialogue system output,
wherein fine-tuning the third language model comprises providing the third language model with the annotated first dialogue system output and the annotated third dialogue system output.

16. A dialogue system, comprising:
one or more processors, configured to:
receive a first language model trained to emulate a persona of a first user of the dialogue system;
receive a second language model trained to evaluate a first dialogue system output;
generate, using the first language model, a first language model output emulating the persona of the first user of the dialogue system;
provide the first language model output to a third language model, wherein the third language model is trained to generate one or more dialogue system outputs from the dialogue system;
responsive to the first language model output, generate, using the third language model, the first dialogue system output, thereby generating a simulated dialogue between the first language model and the third language model, the simulated dialogue comprising at least the first language model output and the first dialogue system output;
evaluate, using the second language model, the first dialogue system output;
fine-tune, using the generated simulated dialogue and the evaluation of the first dialogue system output, the third language model; and fine-tuning, based at least in part on a second dialogue system output from the dialogue system and a feedback on the second dialogue system output, the second language model.

* * * * *